US012771957B2

(12) United States Patent
Zannoni et al.

(10) Patent No.: US 12,771,957 B2
(45) Date of Patent: Oct. 20, 2026

(54) IMAGE SENSOR HAVING PIXEL CLUSTERS EACH INCLUDING AN EVENT PROCESSING CIRCUIT

(71) Applicant: Sony Semiconductor Solutions Corporation, Kanagawa (JP)

(72) Inventors: Massimo Zannoni, Stuttgart (DE); Koji Ogawa, Stuttgart (DE); Raphael Berner, Stuttgart (DE); Eshar Ben Dor, Stuttgart (DE)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 25 days.

(21) Appl. No.: 18/849,547

(22) PCT Filed: Mar. 7, 2023

(86) PCT No.: PCT/EP2023/055788
§ 371 (c)(1),
(2) Date: Sep. 23, 2024

(87) PCT Pub. No.: WO2023/186470
PCT Pub. Date: Oct. 5, 2023

(65) Prior Publication Data

US 2025/0211867 A1 Jun. 26, 2025

(30) Foreign Application Priority Data

Mar. 31, 2022 (EP) .................................... 22166209

(51) Int. Cl.
*H04N 25/47* (2023.01)
*H04N 25/76* (2023.01)
*H04N 25/77* (2023.01)

(52) U.S. Cl.
CPC ............ *H04N 25/47* (2023.01); *H04N 25/77* (2023.01); *H04N 25/7795* (2023.01)

(58) Field of Classification Search
CPC ...... H04N 25/47; H04N 25/77; H04N 25/772; H04N 25/773; H04N 25/779; H04N 25/78
See application file for complete search history.

(56) References Cited

U.S. PATENT DOCUMENTS 4,500,911 A 2/1985 Ninomiya et al.
2007/0229709 A1 10/2007 Asamura et al.
(Continued)

FOREIGN PATENT DOCUMENTS

CN 111612136 A 9/2020
EP 3879816 A1 9/2021
(Continued)

OTHER PUBLICATIONS

International Search Report and Written Opinion mailed on May 23, 2023, received for International Application No. PCT/EP2023/055788 filed on Mar. 7, 2023, 14 pages.

*Primary Examiner* — Daniel M Pasiewicz
(74) *Attorney, Agent, or Firm* — XSENSUS LLP

(57) ABSTRACT

An image sensor includes a plurality of pixel clusters, wherein each pixel cluster includes a number L of pixel circuits. Each pixel circuit outputs pixel event information, wherein the pixel event information indicates whether or not a change of radiation intensity received by the pixel circuit exceeds a positive threshold value and/or whether or not the change of radiation intensity received by the pixel circuit falls below a negative threshold value. An event processing circuit receives pixel information based on the pixel event information of the pixel circuits of a pixel cluster and generates cluster event information indicating whether or
(Continued)

not the pixel information of the L pixel circuits fulfills a predefined cluster output condition.

16 Claims, 20 Drawing Sheets

(56) References Cited

U.S. PATENT DOCUMENTS

| | | | | |
|---|---|---|---|---|
| 2016/0093273 | A1 | 3/2016 | Wang et al. | |
| 2018/0262665 | A1* | 9/2018 | Jung | H04N 23/71 |
| 2018/0357504 | A1 | 12/2018 | Zamir et al. | |
| 2019/0244089 | A1 | 8/2019 | Lee et al. | |
| 2020/0260039 | A1* | 8/2020 | Niwa | H04N 25/47 |
| 2020/0358977 | A1* | 11/2020 | Niwa | H04N 25/75 |
| 2021/0385402 | A1* | 12/2021 | Zhu | H04N 25/00 |
| 2021/0400218 | A1 | 12/2021 | Nomoto | |

FOREIGN PATENT DOCUMENTS

| | | | | |
|---|---|---|---|---|
| WO | WO-2020090311 | A1 * | 5/2020 | H04N 25/77 |
| WO | 2020/263230 | A1 | 12/2020 | |
| WO | 2023/041610 | A1 | 3/2023 | |

* cited by examiner

Example of mask pattern

| | | |
|---|---|---|
| <0> | <1> | <2> |
| <3> | <4> | <5> |
| <6> | <7> | <8> |

IMAGE SENSOR HAVING PIXEL CLUSTERS EACH INCLUDING AN EVENT PROCESSING CIRCUIT

CROSS-REFERENCE TO RELATED APPLICATIONS

The present application is a national stage application, pursuant to 35 U.S.C. § 371, of International Patent Application No. PCT/EP2023/055788, filed Mar. 7, 2023, which claims priority from European Patent Application No. 22166209.1, filed Mar. 31, 2022, the entire contents of each are incorporated herein by reference.

FIELD OF THE INVENTION

The present disclosure relates to an event vision image sensor. More particularly, the present disclosure relates to image sensors with pixel circuits that include event processing circuits.

BACKGROUND

Computer vision is concerned with how machines and computers can extract a high level of relevant information from digital images or video. Typical computer vision methods aim to extract, from raw image data obtained by an image sensor, exactly the kind of information the machine or computer uses for other tasks.

Many applications of image sensors such as machine control, process monitoring, or surveillance cameras are based on evaluating the motion of objects in the imaged scene. Conventional image sensors with a large number of pixels arranged in an array provide a sequence of still images (frames). The detection of moving objects in the sequence of frames typically involves elaborate and complex image processing methods.

Event detection sensors like DVS and EVS tackle the problem of motion detection by delivering information only about the position of changes in the imaged scene. Unlike image sensors that transfer large amounts of image information in frames, transfer of information about pixels that do not change can be omitted, resulting in a sort of in-pixel data compression. The in-pixel data compression removes data redundancy and facilitates high temporal resolution, low latency, low power consumption, high dynamic range and little motion blur. DVS and EVS are thus well suited especially for solar or battery powered compressive sensing or for mobile machine vision applications where the motion of the system including the image sensor has to be estimated and where processing power is limited due to limited battery capacity. In principle, the architecture of DVS and EVS allows for high dynamic range and good low-light performance, in particular in the field of computer vision.

SUMMARY OF INVENTION

In event detection image sensors, the pixel circuit is reset each time the pixel circuit generates event information. Since each reset removes all charge accumulated up to the reset, each reset of the pixel also irretrievably deletes signal information, even if the reset of the pixel was triggered at least in part by noise. As a result, image sensors for event detection can suffer from inaccurate timing and signal jitter, in particular in low-light conditions. In addition, in always-on image systems with event detection pixel circuits, downstream image processing consumes a significant amount of electrical power.

The present disclosure mitigates such shortcomings of conventional event detection image sensors.

To this end, an image sensor according to the present disclosure includes a plurality of pixel clusters, each pixel cluster including a number L of pixel circuits. Each pixel circuit outputs pixel event information, the pixel event information indicating whether or not a change of radiation intensity received by the pixel circuit exceeds an upper threshold value and/or whether or not the change of radiation intensity received by the pixel circuit falls below a lower threshold value. An event processing circuit receives pixel information based on the pixel event information of the pixel circuits of a pixel cluster, and generates cluster event information indicating whether or not the pixel information of the L pixel circuits satisfies a predefined cluster output condition.

In particular, the event processing circuit may be used for spatial or spatio-temporal voting to reduce the likelihood of event information being lost, for example in low-light conditions. Additionally or alternatively, the event processing circuit may be used for feature extraction at an early stage of event processing. Early feature extraction reduces internal bandwidth requirements and/or may significantly reduce computational requirements in a downstream image processing unit. A low-power image sensor with event detection pixel circuits (EVS pixels) and internal feature extraction at the pixel array level can be used to control, e.g., wake up, a downstream, more sophisticated high-performance camera system.

The embodiments described, as well as other advantages, can be best understood with reference to the following detailed description in conjunction with the accompanying drawings.

DETAILED DESCRIPTION

Embodiments for implementing techniques of the present disclosure are described in detail with reference to the drawings. The techniques of the present disclosure are not limited to the embodiments described, and various numerical values and the like in the embodiments are purely illustrative if not stated otherwise. In the following description, like elements or elements having like functions are indicated by the same reference signs, and repetition of the description of elements drawn more than once is avoided.

Electronic elements may be electrically connected by a direct, permanent, low-impedance connection, e.g., through a conductive line. The terms "electrically connected" and "signal-connected" may also include a connection through other electronic elements intended and suitable for permanent and/or temporary signal transmission and/or power transmission. For example, electronic elements may also be electrically connected and signal-connected through electronic switches such as transistors or transistor circuits, e.g. MOSFETs, transmission gates, and others.

Although the following describes a technology for fast data readout from image sensors in the context of certain types of image sensors for event detection, the technology can also be used for other types of image sensors, e.g. such as those image sensors that combine event detection and intensity readout.

Figure 1:
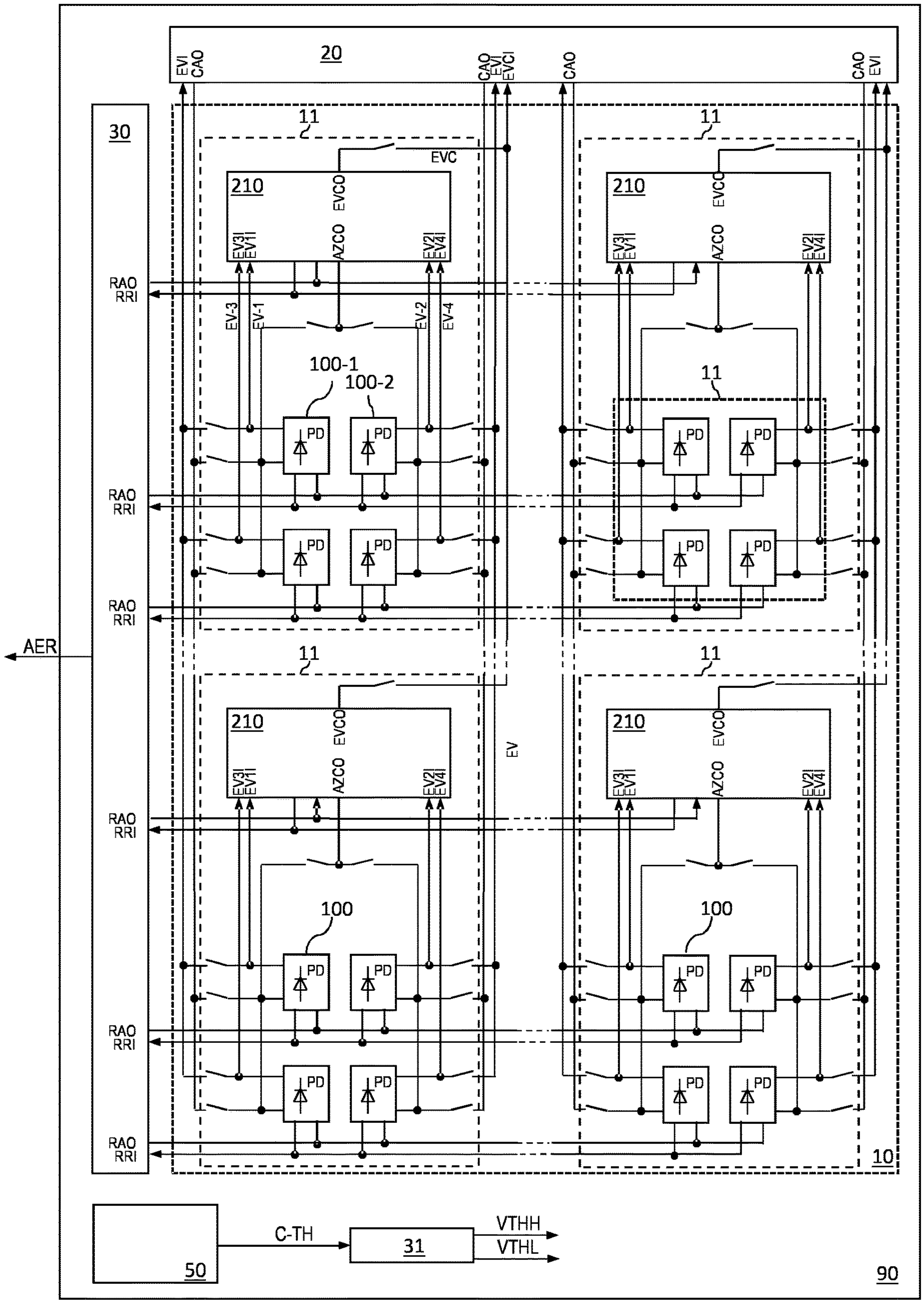
FIG. 1 shows a simplified block diagram of an image sensor that includes event detection pixel circuits and in-array event processing circuits according to an embodiment of the present disclosure.

FIG. 1 is a block diagram of an image sensor 90 for light intensity change detection, also referred to as event detection. The image sensor 90 includes a pixel array unit 10 including a plurality of pixel circuits 100, a row control circuit 30, a column readout circuit 20, and a controller 50.

Each pixel circuit 100 includes a photoreceptor module with at least one photoelectric conversion element PD. Each pixel circuit 100 converts electromagnetic radiation impinging onto a detection area of the photoelectric conversion element PD into digital, e.g. binary pixel event information containing information about events. Each event indicates a certain change of the received radiation energy. A pixel-on event Ev_on indicates that an increase in illumination energy between a previous sampling and a new sampling is higher than a predefined upper threshold. A pixel-off event Ev_off indicates that a drop in illumination energy between a previous sampling and a new sampling is greater than a predefined lower threshold.

Each pixel circuit 100 temporary stores each event until the event is read out, wherein an on-event signal EVH is read out in case a pixel-on event EV_on has been detected, an off-event signal EVL is read out in case a pixel-off event Ev_off has been detected, and neither an on-event signal EVH nor an off-event signal EVL is readout when no event has occurred ("no event").

The on-event signals EVH and the off-event signals EVL can be read out on different pixel event signal lines or can be read out through the same pixel event signal line.

Each pixel circuit 100 is assigned to a pixel row and to a pixel column. The photoelectric conversion elements PD of the same pixel row may be formed on straight or meandering first lines. The photoelectric conversion elements PD of the same pixel column be formed on straight or meandering second lines, wherein the first lines run orthogonal the first lines.

Sets of row signal lines connect the pixel circuits 100 with the row control circuit 30, wherein each set of row signal lines connects the pixel circuits 100 of one pixel row with the row control circuit 30. The row control circuit 30 generates row control signals that control the pixel circuits 100.

Sets of column signal lines connect the pixel circuits 100 with the column readout circuit 20, wherein each set of column signal lines connects the pixel circuits 100 of one pixel column with the column readout circuit 20. Each set of column signal lines includes one pixel event signal line for sequentially transmitting the pixel-on events and pixel-off events in a time-multiplex scheme, or two pixel event signal lines, a first pixel event signal line for transmitting the pixel-on events and a second pixel event signal line for transmitting the pixel-off events.

Number and signal-type of further column signal lines of the set of column signal lines and number and signal-type of the row signal lines of a set of row signal lines depend on the implemented readout scheme, in particular on whether an event-triggered readout or a sequential readout is implemented.

Embodiments of the present application may be implemented for event-triggered readout and/or sequential readout. FIG. 1 shows an example of event-triggered readout for illustration.

For the event-triggered readout, each pixel circuit 100 having detected an event signalizes the event to the row control circuit 30 by outputting a row request signal RR on a row request line. The row control circuit 30 receives the row request signal RR at a row request input RRI. The row control circuit 30 compiles a row address of the signaling pixel circuit 100 and may output a row acknowledge signal RA on a row acknowledge output RAO. The row address describes the position of the pixel circuit 100 in the pixel column. A row acknowledge line passes the row acknowledge signal RA to all pixel circuits 100 of the same pixel row. The pertinent set of row signal lines includes at least the row request line and the row acknowledge line.

At the latest after receiving the row acknowledge signal RA, the pixel circuit 100 outputs the pixel event information EV on one pixel event signal line or on two pixel event signal lines, wherein a first pixel event signal line transmits the pixel-on signals, and a second pixel event signal line transmits the pixel-off signals. The column readout circuit 20 receives the events on one or two event inputs EVI per pixel column. The column readout circuit 20 compiles a column address of the signaling pixel circuit 100. The column address identifies the position of the pixel circuit 100 in the pixel row. The column readout circuit 20 may output a column acknowledge signal CA on a column acknowledge output CAO. A column acknowledge line may transmit the column acknowledge signal CA to all pixel circuits 100 of the same pixel column. The pertinent set of column signal lines includes one or two event signals lines, and may further include the column acknowledge line.

From the row address and the column address, the row control circuit 30 and the column readout circuit 20 compile an address event representation (AER) of each event, wherein the address/event representation includes the row address and the column address of the pixel circuit 100, information about the type of event, and a time stamp. The row control circuit 30 and/or the column readout circuit 20 may reset the pixel circuits 100 by selectively acknowledging the event signals.

The controller 50 may coordinate the compilation of AERs for each event by collecting address information from the row control circuit 30 and the column readout circuit 20 and supplementing the address information with timing information and information about the type of event, so that the row control circuit 30 and the column readout circuit 20 output a stream of AERs to a signal processing unit external to the image sensor 90.

A controller 50 controls the row control circuit 30 and the column readout circuit 20. The controller 50 may control the row control circuit 30 and the column readout circuit 20 to perform a sequential readout, or an event-triggered readout.

For the sequential readout, the controller 50 controls the row control circuit 30 to scan the pixel array unit 10 for events according to a periodic scheme, e.g. by successively selecting the pixel circuits 100 row-by-row. The pertinent set of row signal lines includes at least a row select line for transmitting a row select signal.

The column readout circuit includes a column processing unit for each pixel column, and a column readout buffer. The pertinent set of column signal lines includes at least one pixel event signal line for transmitting the pixel event information EV. Each column processing unit includes a signal detector circuit for each pixel event signal line and a column readout buffer. The signal detector circuits latch the pixel event information received for each row selection period, wherein the pixel event information EV contains information about pixel-on events, pixel-off events, or no event. The column readout buffer may output the latched pixel event information and outputs the pixel event information EV in a predefined order to a signal processing unit external to the image sensor 90.

In addition, the controller 50 may control a threshold voltage generation circuit 31 that determines and supplies one or more reference voltages to individual pixel circuits 100 in the pixel array unit 10, wherein the pixel circuits 100 may use the reference voltage or voltage signals derived from the reference voltage as threshold voltages for comparison decisions. For example, the threshold voltage generation circuit 31 may generate a lower threshold voltage VTHL and an upper threshold voltage VTHL, VTHH and may supply the lower and upper threshold voltages VTH through threshold voltage lines to all pixel circuits 100 of the pixel array unit 10.

FIG. 1 further shows a plurality of pixel clusters 11, wherein each pixel cluster 11 includes a number L of pixel circuits 100. Each pixel circuit 100 is configured to output pixel event information EV, wherein the pixel event information EV indicates whether or not a change of radiation intensity received by the pixel circuit 100 exceeds a positive threshold value and whether or not the change of the radiation intensity received by the pixel circuit 100 falls below a negative threshold value. Each pixel cluster 11 further includes an event processing circuit 210 that is configured to receive pixel information EP based on the pixel event information EV of the pixel circuits 100 of a pixel cluster 11 and generate cluster event information EVC indicating whether or not the pixel information EP of the L pixel circuits 100 fulfills a predefined cluster output condition.

FIG. 1 shows pixel clusters 11 with four pixel circuits 100 for illustration. Other embodiments provide pixel clusters 11 with less than four pixel circuits 100 or with more than four pixel circuits 100. In addition, FIG. 1 shows pixel circuits 100 that are assigned to only one event processing circuit 100 for illustration. According to other embodiments, each pixel circuit 100 may be part of more than one pixel cluster 11. Further in addition, FIG. 1 shows that the event processing circuit 210 directly receives and processes the pixel event information EV as the pixel information EP. According other embodiments, additional electronic circuits may preprocess the pixel event information EV and pass the preprocessed pixel event information as pixel information EP to the event processing circuit 210.

Switches may alternately connect the pixel circuits 100 to the row signal lines and column signal lines used for regular event-triggered or sequential pixel readout in a first operation mode and to the event processing circuit 210 in a second operation mode. Alternatively, each pixel circuit 100 may be permanently connected to both the set of row signal lines and the set of column signal lines used for regular event-triggered or sequential pixel readout and the event processing circuit 210.

A wiring of the event processing circuits 210 may be separated from the row signal lines and column signal lines used for regular event-triggered or sequential pixel readout. Alternatively, the event processing circuits 210 may use at least some of the row signal lines and column signal lines used for regular event-triggered or sequential pixel readout of the pixel circuits 100.

For illustration, FIG. 1 shows each event processing circuit 210 connected to a row request line, a row acknowledge line and a cluster event signal line, wherein the cluster event signal line connects event processing circuits 210 assigned to pixel circuits 100 in the same pixel column(s) with a cluster event input EVCI of the column readout circuit 20 and transmits the cluster event information EVC from the event processing circuits 210 to the column readout circuit 20.

Figure 2A:
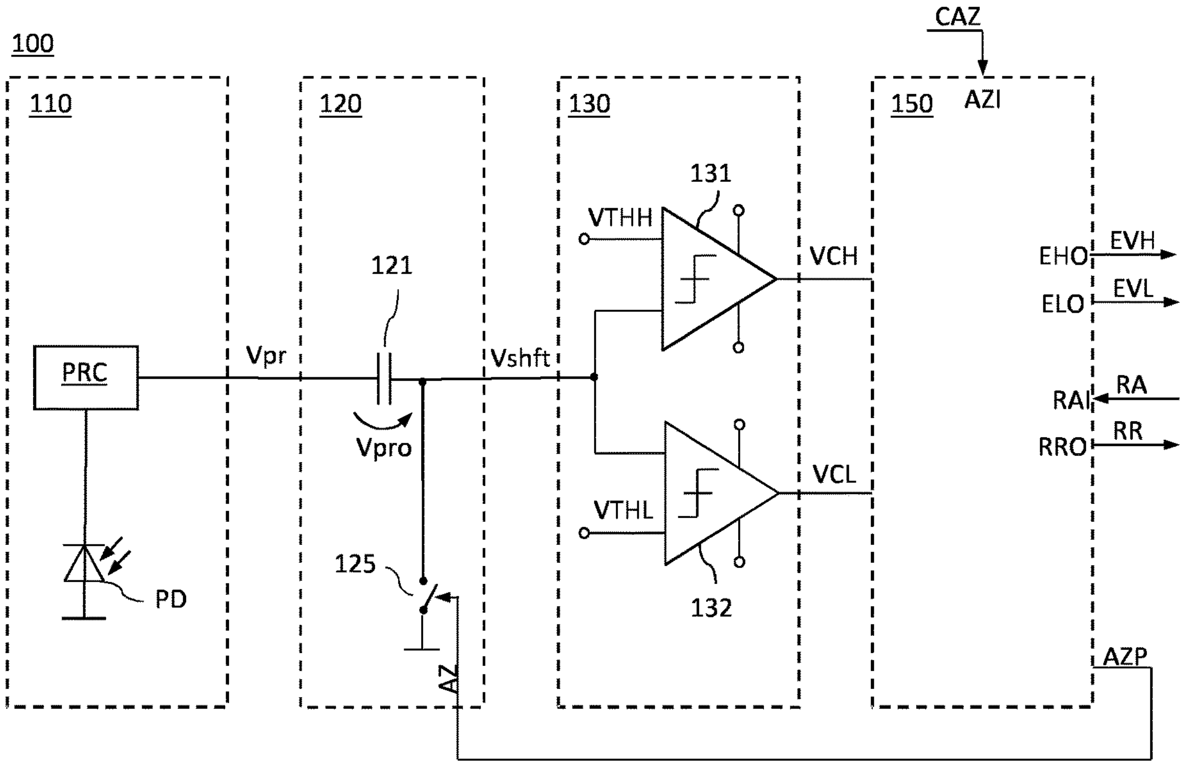
FIGS. 2A to 2C are simplified block diagrams of pixel circuits for event detection suitable to be used in the embodiments of the present disclosure.
Figure 2B:
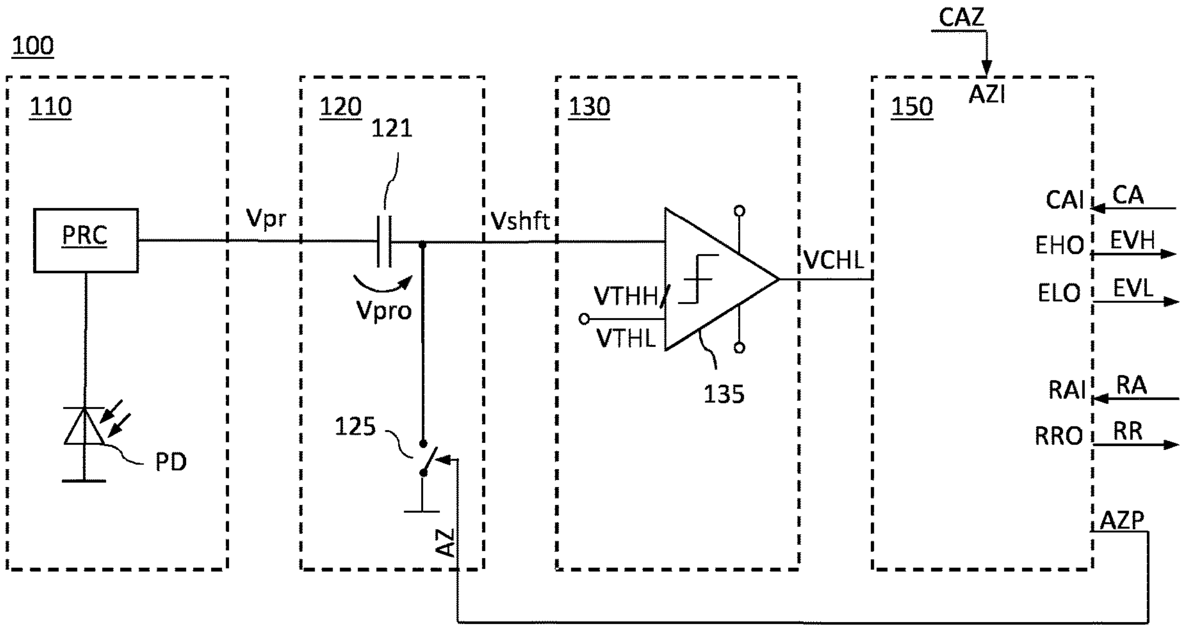
Figure 2C:
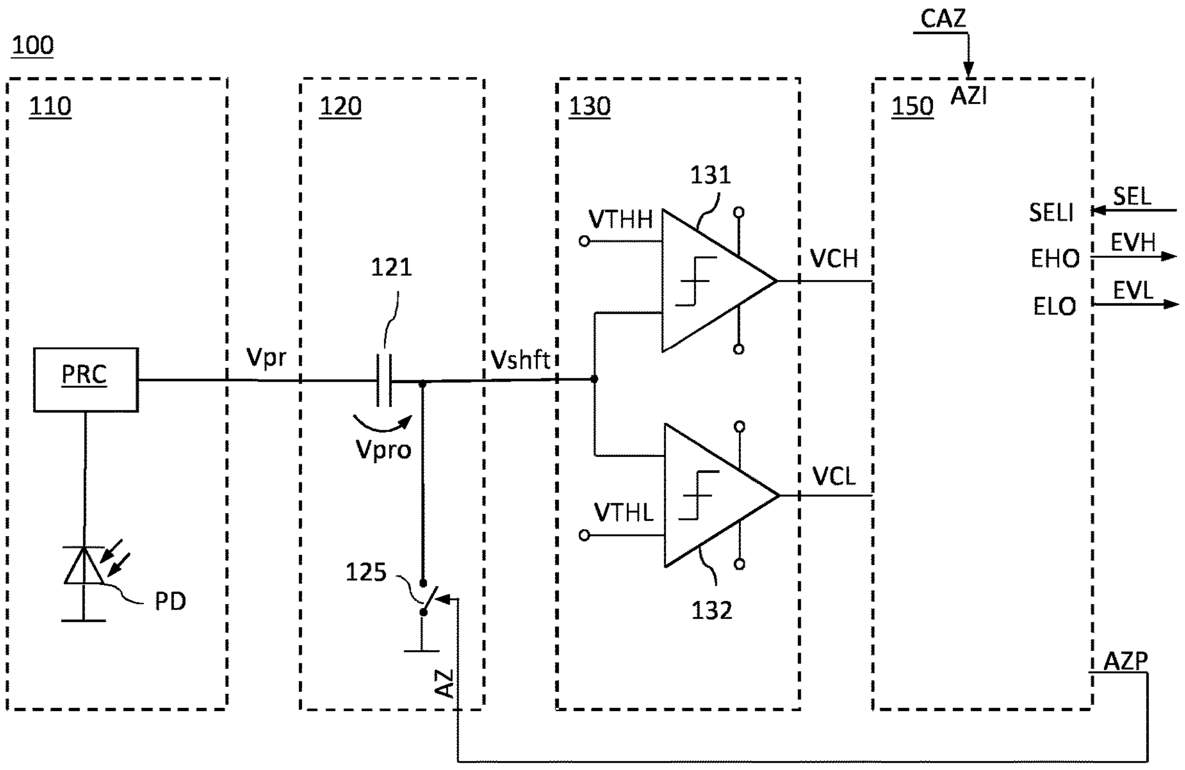

FIG. 2A through FIG. 2C show various examples of event detection pixel circuits 100 that may be combined with the event processing circuit 210 shown in FIG. 1.

Each such pixel circuit 100 for event detection includes a photoreceptor module 110, a voltage differencing circuit 120, and a pixel logic circuit 150. The photoreceptor module 110 outputs a pixel voltage signal Vpr, wherein a voltage level of the pixel voltage signal Vpr is a function of incoming light intensity. The voltage differencing circuit 120 generates a shifted pixel signal Vshft by shifting a voltage level of the pixel voltage signal Vpr by an amount determined by a voltage level of the pixel voltage signal Vpr at a reset time. The pixel logic circuit 150 outputs the pixel event information EV based on a result of comparisons of the shifted pixel signal Vshft with an upper threshold voltage VTHH and a lower threshold voltage VTHL.

In particular, the photoreceptor module 110 includes a photoelectric conversion element PD and outputs a photoreceptor signal Vpr with a voltage level that depends on a detector current generated by the photoelectric conversion element PD.

The photoelectric conversion element PD may include or consist of a photodiode which by means of the photoelectric effect converts electromagnetic radiation incident on a detection surface into the detector current. The electromagnetic radiation may include visible light, infrared radiation and/or ultraviolet radiation. The amplitude of the detector current is a function of the intensity of the incident electromagnetic radiation, wherein in the intensity range of interest the detector current increases approximately linearly with increasing intensity of the detected electromagnetic radiation.

The photoreceptor module 110 may further include a photoreceptor circuit PRC that converts the detector current into a photoreceptor signal Vpr. The voltage of the photoreceptor signal Vpr is a function of the detector current, and in the voltage range of interest, the voltage amplitude of the photoreceptor signal Vpr increases as the detector current increases. For example, the voltage of the photoreceptor signal Vpr increases logarithmically with detector current.

The voltage differencing circuit 120 subtracts a previously evaluated photoreceptor voltage Vpro from the current photoreceptor signal Vpr to obtain a difference signal (shifted pixel signal Vshft) representing a voltage difference between the previously evaluated photoreceptor voltage Vpro and the present voltage of the photoreceptor signal Vpr. For example, the voltage differencing circuit 120 may include a sample capacitor 121 with a first electrode configured to receive the photoreceptor signal Vpr. The sample capacitor 121 is controlled to store a charge for a voltage drop across the sample capacitor 121 equal to the previously evaluated photoreceptor voltage Vpro. To this end, a reset element 125 resets a potential at the second electrode of the sample capacitor 121 to a predefined potential in response to an active autozero signal AZ.

A comparator stage 130 compares the shifted pixel signal Vshft with a lower threshold voltage VTHL and an upper threshold voltage VTHH.

In FIG. 2A the comparator stage 130 includes two comparators 131, 132 for simultaneously comparing the shifted pixel signal Vshft with the upper voltage threshold VTHH and with the lower voltage threshold VTHL.

Each comparator 131, 132 may output a digital comparator output signal VCL, VCH, e.g. a binary signal, wherein one of the voltage levels of the comparator output signals indicates that the shifted pixel signal Vshft exceeds the corresponding threshold voltage and wherein another or the other voltage level of the comparator output signal indicates that the shifted pixel signal Vshft does not exceed the corresponding threshold voltage.

In FIG. 2B the comparator stage 130 includes one single comparator 135 for successively comparing the shifted pixel signal Vshft with the upper voltage threshold VTHH and with the lower voltage threshold VTHL. The comparator output signal VCHL outputs the results of both comparisons one after the other.

The comparator output signals VCL, VCH, VCHL represent the pixel event information. The pixel event information contains a pixel-on event EV_on, if a comparator output signal VCH, VCL, VCHL indicates that the shifted pixel signal Vshft exceeds the upper voltage threshold VTHH, a pixel-off event EV_off, if a comparator output signal VCH, VCL, VCHL indicates that the shifted pixel signal Vshft falls below the lower voltage threshold VTHL, or no event, if none of the comparator output signals VCH, VCL, VCHL indicates that the shifted pixel signal Vshft exceeds the upper voltage threshold VTHH, or that the shifted pixel signal Vshft falls below the lower voltage threshold VTH.

The pixel logic circuit 150 may temporarily store the pixel event information in the pixel circuit 100 until the next pixel readout.

The pixel logic circuits 150 in FIG. 2A and FIG. 2B are examples suitable for event-triggered readout. The pixel logic circuits 150 may generate a row request signal RR in case an event has been detected and may output the row request signal RR at a row request output RRO. The row request output RRO may be an open collector output or any other output type allowing a plurality of pixel circuits 100 to be connected to the same row request line. The pixel logic circuit 150 generates an on-event signal EVH in case a pixel-on event EV_on has been detected, or an off-event signal EVL in case a pixel-off event Ev_off has been detected.

In the illustrated embodiment, the pixel logic circuit 150 includes a pixel-off event output ELO for outputting the on-event signal EVH and a pixel-on event output EHO for outputting the off-event signal EVL.

In case the shifted pixel signal Vshft exceeds the upper voltage threshold VTHH, the pixel logic circuit 150 generates an on-event signal EVH and outputs the on-event signal EVH at the pixel-on event output EHO. In case the shifted pixel signal Vshft falls below the lower voltage threshold VTHL, the pixel logic circuit 150 generates an off-event signal EVL and outputs the off-event signal EVL at the pixel-off event output ELO.

The pixel logic circuit 150 may set the on-event signal EVH or the off-event signal EVL active simultaneously with the row request signal RR, wherein the high event outputs EHO and the low event outputs ELO may be open collector outputs or may have any other output type allowing a plurality of pixel circuits 100 to be connected to the same event signaling line.

Alternatively, the pixel logic circuit 150 may set the on-event signal EVH or the off-event signal EVL active only after being selected by the column readout circuit 20, wherein the high event output EHO and the low event output ELO may be push/pull outputs, by way of example. The pixel logic circuit 150 further includes a row acknowledgement input RAI for receiving a row acknowledge signal RA.

In the pixel circuit 100 of FIG. 2B, pixel logic circuit 150 includes a column acknowledgement input CAI for receiving a column acknowledge signal CA. According to other examples of the pixel logic circuit 150 as illustrated in FIG. 2A, the column acknowledgement input CAI is omitted and no column acknowledgement signals are passed to the pixel circuits 100.

The pixel logic circuit 150 resets an active row request signal RR in response to receiving an active row acknowledge signal RA. In addition, the pixel logic circuit 150 may trigger an update of the previously evaluated photoreceptor voltage Vpro with the current photoreceptor voltage Vpr in the voltage differencing circuit 120 in response to receiving the row acknowledge signal RA, by outputting an active pixel autozero signal AZP at an autozero signal output AZO.

The pixel logic circuit 150 of FIG. 2B may reset the on-event signal EVH and/or the off-event signal EVL to an inactive level in response to receiving a column acknowledge signal CA. In the absence of column acknowledgement signals CA and column acknowledgement inputs CI as it is the case in the pixel circuit 100 of FIG. 2A, the in-pixel communication circuit CC may reset the on-event signal EVH and/or the off-event signal EVL in response to receiving the active row acknowledge signal RA.

If the pixel logic circuit 150 includes a storage element holding the pixel event information, the pixel event information may be reset (cleared) in response to receiving the row acknowledge signal RA or in response to receiving the column acknowledge signal CA.

FIG. 2C refers to a pixel circuit 100 for readout at regular time intervals. The pixel circuits 100 are sequentially read out row-by-row by using a row select signal SEL at a select signal input SELI. Each readout may trigger an update of the previously evaluated photoreceptor voltage Vpro with the current photoreceptor voltage Vpr in the voltage differencing circuit 120 by outputting an active pixel autozero signal AZP at an autozero signal output AZO, in particular, when a pixel-on event EV_on and/or a pixel-off event EV_off has been readout from the concerned pixel circuit 100. In addition, each readout resets (clears) the pixel event information.

In each of the pixel circuits 100 of FIG. 2A to FIG. 2C, the pixel logic circuit 150 may receive an autozero control signal CAZ at an autozero control input AZI. The autozero control signal CAZ may be generated by the sensor controller 50 of FIG. 1. The autozero control signal CAZ may control the pixel autozero signal AZP. For example, the pixel autozero signal AZP becomes active only when both the autozero control signal CAZ is active and either the on-event signal EVH or the off-event signal EVL is active.

Figure 3:
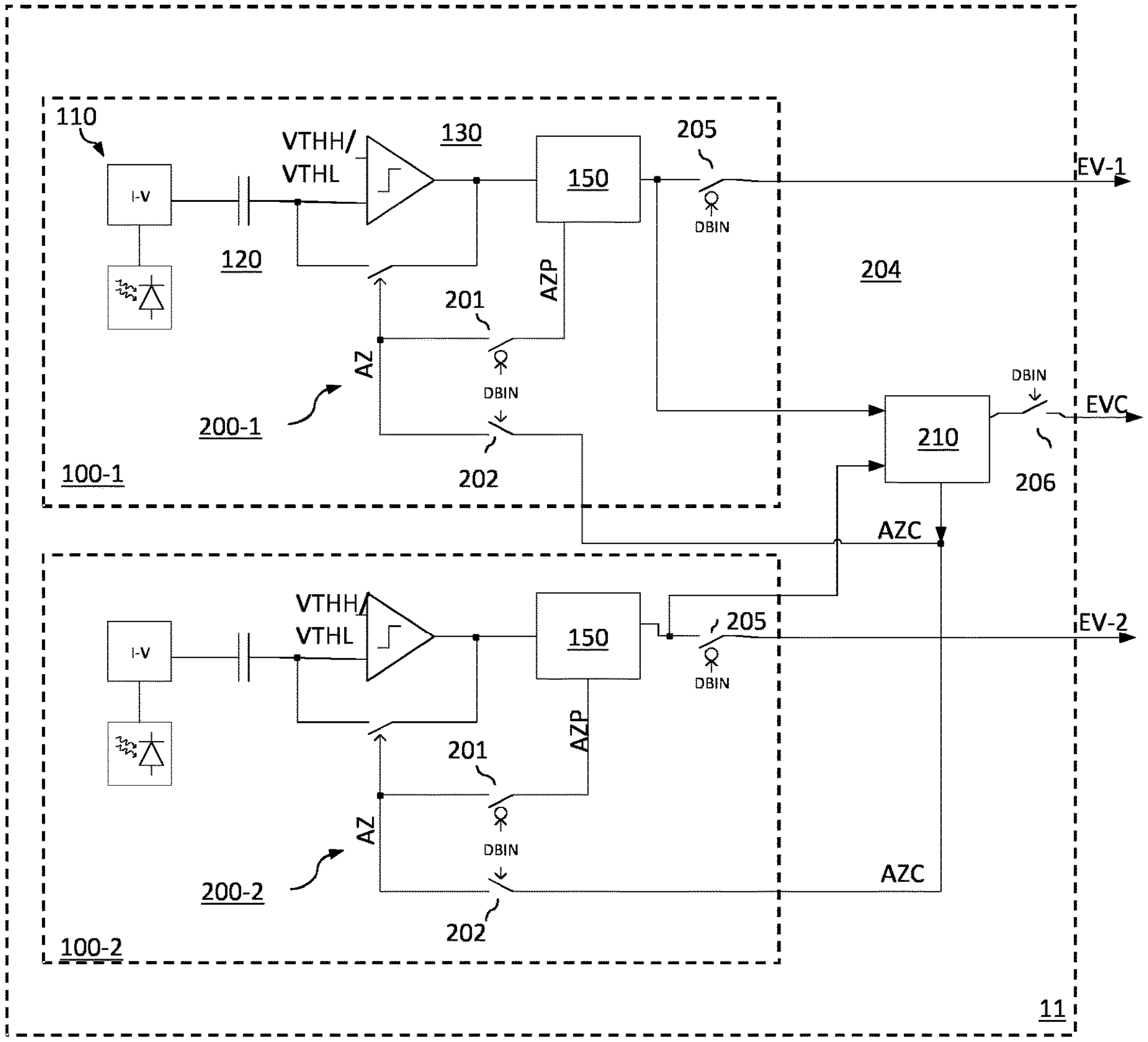
FIG. 3 shows a simplified circuit diagram of a portion of an image sensor including an event processing circuit according to an embodiment concerning spatial voting.

FIG. 3 shows a part of a pixel array unit 10 of an illustrative image sensor 90 that includes a pixel cluster 11 with two pixel circuits 100-1, 100-2 and an event processing circuit 210. Each pixel circuit 100-1, 100-2 includes a photoreceptor module 110 that outputs a pixel voltage signal with a voltage level that is a function of incoming light intensity. A voltage differencing circuit 120 generates a shifted pixel signal by shifting a voltage level of the pixel voltage signal by an amount determined by a voltage level of the pixel voltage signal at a reset time. A comparator circuit 130 compares the difference signal with an upper voltage threshold VTHH and with a lower voltage threshold VTHL.

A pixel logic circuit 150 outputs pixel event information EV-1, EV-2 based on a result of the comparisons of the shifted pixel signal with the upper voltage threshold VTHH and the lower voltage threshold VTHL. In particular, the pixel event information EV-1, EV2 indicates whether or not a change of radiation intensity received by the pixel circuit 100-1, 100-2 exceeds an upper threshold value and whether or not the change of radiation intensity received by the pixel circuit 100-1, 100-2 falls below a lower threshold value. In case the pixel logic circuit 150 processes an event, the pixel logic circuit 150 further outputs an active pixel autozero signal AZ. In response to an active pixel autozero signal AZ, the voltage differencing circuit 120 is reset, wherein the voltage differencing circuit 120 resets the shifted pixel signal and updates the voltage to be subtracted from the pixel voltage signal.

The event processing circuit 210 receives the pixel information EV-1, EV-2 of all pixel circuits 100 of the pixel cluster 11 and generates cluster event information EVC. The cluster event information EVC indicates whether or not the pixel information EV-1, EV-2 of the pixel circuits 100 fulfills a predefined cluster output condition.

The event processing circuit 210 resets the voltage differencing circuit 120 each time the pixel event information EV-1, EV-2 received from the pixel circuits 100 of a pixel cluster 11 fulfills a predefined pixel reset condition. Resetting the voltage differencing circuit 120 includes resetting the shifted pixel signal to a reference voltage and thereby updating the voltage to be subtracted from the pixel voltage signal.

To this end, the event processing circuit 210 outputs an active cluster autozero signal AZC when the predefined cluster output condition is fulfilled. The voltage differencing circuit 120 receives the cluster autozero signal AZC and processes the cluster autozero signal ACZ in the same way as the pixel autozero signal AZ received from the pixel logic circuit 150.

Each pixel cluster 11 further includes a switchover circuit 200-1, 200-2 configured to switch control of a reset of the voltage differencing circuit 120 between the pixel logic circuit 150 and the event processing circuit 210.

Each switchover circuit 200-1, 200-2 includes a first switch 201 between an autozero signal output of the pixel logic circuit 150 and an autozero input of the voltage differencing circuit 120. In response to an active inverted cluster control signal XDBIN the first switch 201 turns on and passes the pixel autozero signal AZP from the pixel logic circuit 150 as autozero signal AZ to the voltage differencing circuit 120.

A second switch 202 between an autozero signal output of the event processing circuit 210 and the autozero input of the voltage differencing circuit 120 turns on in response to an active cluster control signal DBIN to pass the cluster autozero signal AZC from the event processing circuit 210 as autozero signal AZ to the voltage differencing circuit 120. The inverted cluster control signal XDBIN is obtained by inverting the cluster control signal DBIN.

Each pixel cluster 11 may further include a routing circuit 204 that passes the pixel event information EV-1, EV-2 to pixel event signal lines in a first operation mode and that passes the cluster event information EVC to a cluster event signal line in a second operation mode.

For each pixel circuit 100-1, 100-2, the routing circuit 204 includes a pixel routing switch 205 between an event signal output of the pixel logic circuit 150 and a pixel event signal line. In response to the active inverted cluster control signal XDBIN, the pixel routing switch 205 turns on and passes the pixel event information EV-1, EV-2 from the pixel logic circuit 150 to the pixel event signal line. Each pixel routing switch 205 may include one switch element per pixel circuit 100-1, 100-2, if the pixel logic circuit 150 outputs pixel-on events and pixel-off events on the same pixel event signal line, and may include two switch elements per pixel circuit 100-1, 100-2, if the pixel logic circuit 150 outputs pixel-on events and pixel-off events on two different pixel event signal lines.

A cluster routing switch 206 is connected between a cluster event output of the event processing circuit 210 and a cluster event signal line. In response to the active cluster control signal DBIN, the cluster routing switch 206 turns on and passes the cluster event information EVC from the event processing circuit 210 to the cluster event signal line, which may be one of the pixel event signal lines used for transmitting the pixel event information EV-1, EV-2, or a dedicated cluster event signal line used exclusively for transmitting cluster event information EVC.

The cluster routing switch 206 may include one switch element, if the event processing circuit 210 outputs cluster-on events and cluster-off events on the same cluster event signal line, and may include two switch elements, if the event processing circuit 210 outputs cluster-on events and cluster-off events on two different cluster event signal lines.

The event processing circuit 210 may reset the voltage differencing circuit 120 and/or generate cluster event information EVC indicating that the pixel information received from the pixel circuits 100-1, 100-2 of the pixel cluster 11 fulfills the predefined cluster output condition, if a majority of the pixel information EP received by the event processing circuit 210 from the pixel circuits 100 of the pixel cluster 11 indicates a pixel-on event Ev_on and/or if a majority of the pixel information EP received by the event processing circuit 210 from the pixel circuits 100 of the pixel cluster 11 indicates a pixel-off event Ev_off.

Pixel-on events Ev_on received by the event processing circuit 210 from the pixel circuits 100 of the pixel cluster 11 may have the majority, if the event processing circuit 210 receives more pixel-on events Ev_on from the pixel circuits 100 of the pixel cluster 11 than pixel-off events En_off. Pixel-off events Ev_off received by the event processing circuit 210 from the pixel circuits 100 of the pixel cluster 11 may have the majority, if the event processing circuit 210 receives more pixel-off events Ev_off from the pixel circuits 100 of the pixel cluster 11 than pixel-on events Ev_on.

In particular, pixel-on events Ev_on received by the event processing circuit 210 from the pixel circuits 100 of the pixel cluster 11 may have the majority, if the event processing circuit 210 receives more pixel-on events Ev_on from the pixel circuits 100 of the pixel cluster 11 than pixel-off events En_off and no events. Pixel-off events Ev_off received by the event processing circuit 210 from the pixel circuits 100 of the pixel cluster 11 may have the majority, if the event processing circuit 210 receives more pixel-off events Ev_off from the pixel circuits 100 of the pixel cluster 11 than no events and pixel-on events Ev_on.

Alternatively pixel-on events Ev_on received by the event processing circuit 210 from the pixel circuits 100 of the pixel cluster 11 may have the majority, if the event processing circuit 210 receives at least one Ev_on and no pixel-off event En_off from the pixel circuits 100 of the pixel cluster 11. Pixel-off events Ev_off received by the event processing circuit 210 from the pixel circuits 100 of the pixel cluster 11 may have the majority, if the event processing circuit 210 receives at least one pixel-off event Ev_off and no pixel-on events Ev_on from the pixel circuits 100 of the pixel cluster 11.

In FIG. 3 the event processing circuit 210 directly receives the pixel event information EV-1, EV-2 output by the pixel circuits 100-1, 100-2. The pixel event information EV output by the pixel circuits 100-1, 100-2 and the pixel information EP received by the event processing circuit 210 are identical.

Pixel-on events Ev_on received by the event processing circuit 210 from the pixel circuits 100 of the pixel cluster 11 may have the majority, if the pixel circuits 100-1, 100-2 of the pixel cluster 11 output more pixel-on events Ev_on than pixel-off events En_off. Pixel-off events Ev_off received by the event processing circuit 210 from the pixel circuits 100 of the pixel cluster 11 may have the majority, if the pixel circuits 100-1, 100-2 of the pixel cluster 11 output more pixel-off events Ev_off than pixel-on events Ev_on.

Pixel-on events Ev_on received by the event processing circuit 210 from the pixel circuits 100 of the pixel cluster 11 may have the majority, if the pixel circuits 100-1, 100-2 of the pixel cluster 11 output more pixel-on events Ev_on than pixel-off events En_off and no events. Pixel-off events Ev_off received by the event processing circuit 210 from the pixel circuits 100 of the pixel cluster 11 may have the majority, if the pixel circuits 100-1, 100-2 of the pixel cluster 11 output more pixel-off events Ev_off than no events and pixel-on events Ev_on.

Alternatively, pixel-on events Ev_on received by the event processing circuit 210 from the pixel circuits 100 of the pixel cluster 11 may have the majority, if at least one of the pixel circuits 100-1, 100-2 of the pixel cluster 11 outputs a pixel-on event Ev_on and none of the pixel circuits 100-1, 100-2 outputs a pixel-off event En_off. Pixel-off events Ev_off received by the event processing circuit 210 from the pixel circuits 100 of the pixel cluster 11 may have the majority, when at least one of the pixel circuits 100-1, 100-2 of the pixel cluster 11 outputs a pixel-off event Ev_off and none of the pixel circuits 100-1, 100-2 outputs a pixel-on event En_on.

Figure 4:
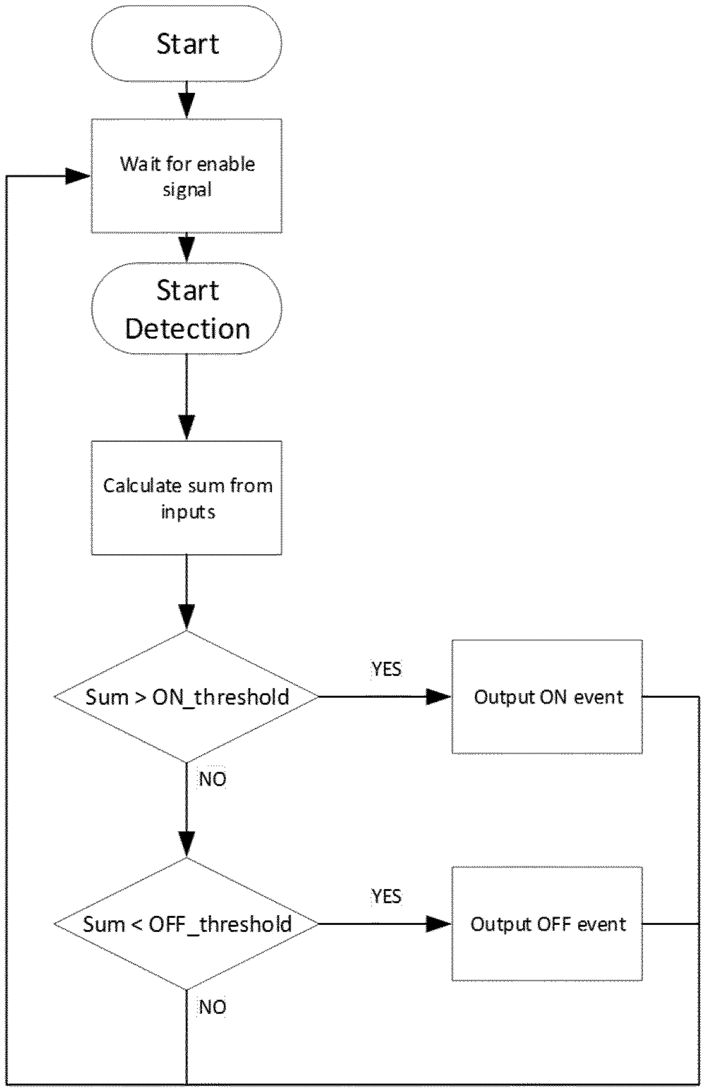
FIG. 4 shows a simplified flow diagram of a majority voting applied by the event processing circuit of FIG. 3 according to an embodiment.

FIG. 4 shows an example for an operating mode of the event processing circuit 210 according to another example, wherein the event processing circuit 210 weights pixel-on events with a positive weight factor and pixel-off events with a negative weight factor. Pixel-on events received by the event processing circuit 210 from the pixel circuits 100 of the pixel cluster 11 have the majority, if a sum of pixel-on events Ev_on received from the pixel circuits 100 of the pixel cluster 11 and weighted with the positive weight factor and pixel-off events Ev_off received from the pixel circuits 100 of the pixel cluster 11 and weighted with the negative weight factor, is higher than a preset On-threshold. Pixel-off events received by the event processing circuit 210 from the pixel circuits 100 of the pixel cluster 11 have the majority, if a sum of pixel-on events Ev_on received from the pixel circuits 100 of the pixel cluster 11 and weighted with the positive weight factor and pixel-off events Ev_off received from the pixel circuits 100 of the pixel cluster 11 and weighted with the negative weight factor, is lower than a preset Off-threshold.

The On-threshold can have a positive value. The off-threshold can have a negative value. For example, the On-threshold can be half the number L of pixel circuits per pixel cluster, and the Off-threshold can be half the number L of pixel circuits per pixel cluster, multiplied with −1.

In particular, for the event processing circuit 210 in FIG. 3, pixel-on events received by the event processing circuit 210 from the pixel circuits 100 of the pixel cluster 11 have the majority, if a sum of pixel-on events Ev_on output by the pixel circuits 100 of the pixel cluster 11 and weighted with the positive weight factor, and pixel-off events Ev_off output by the pixel circuits 100 of the pixel cluster 11 and weighted with the negative weight factor is higher than a preset on-threshold. Pixel-off events received by the event processing circuit 210 from the pixel circuits 100 of the pixel cluster 11 have the majority, if a sum of pixel-on events Ev_on output by the pixel circuits 100 of the pixel cluster 11 and weighted with the positive weight factor and pixel-off events Ev_off output by the pixel circuits 100 of the pixel cluster 11 and weighted with the negative weight factor is lower than a preset off-threshold.

After power-on and/or a device reset, the event processing circuit 210 waits for an enable signal. The enable signal may be an active cluster control signal DBIN, may be derived from the cluster control signal DBIN, or may be derived from a same source signal as the cluster control signal DBIN. After receiving an active enable signal, the event processing circuit 210 starts detecting the pixel event information EV-1, EV-2, . . . , applies a positive weight to the pixel-on events received from the pixel circuits 100 of the pixel cluster 11, applies a negative weight to the pixel-off events and calculates the sum of the weighted pixel-on events and pixel-off events. In other words, the event processing circuit 210 separately sums up the pixel-on events and the pixel-off events and subtracts the sum of the pixel-off events from the sum of the pixel on-events to obtain a sum of weighted pixel-on events and weighted pixel-off events (weighted sum).

The event processing circuit 210 compares the weighted sum with a preset On-Threshold. If the weighted sum exceeds the preset On-threshold, the event processing circuit 210 outputs a cluster-on event EVC-on and returns into the state waiting for an enable signal. If the weighted sum does not exceed the preset On-threshold, the event processing circuit 210 compares the weighted sum with a preset Off-Threshold. If the weighted sum falls below the preset Off-threshold, the event processing circuit 210 outputs a cluster-off event EVC-off and returns into the state waiting for an enable signal. If the sum of pixel-on events Ev_off does not exceed the preset OFF-threshold, the event processing circuit 210 directly returns into the state waiting for an enable signal without outputting any cluster-on event or cluster-off event.

Figure 5:
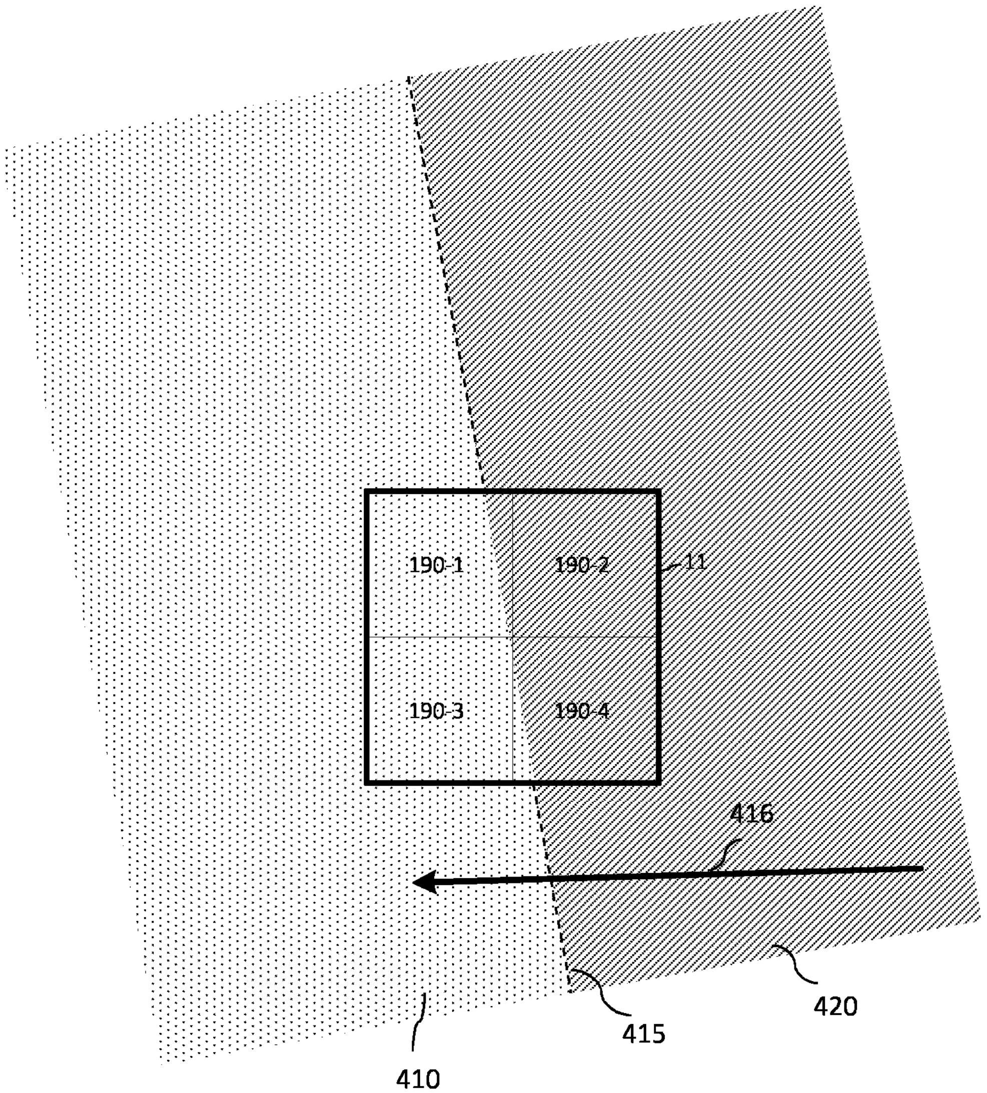
FIG. 5 shows photoreception areas of a pixel circuits in a pixel cluster for discussing the effect of spatial voting according to an embodiment.

FIG. 5 shows light sensitive areas 190-1, 190-2, 190-3, 190-4 of a pixel cluster 11 that includes four pixel circuits 100. An edge 415 between a bright area 410 and a dark area 420 in a scene moves across the light sensitive areas 190-1, 190-2, 190-3, 190-4 in the direction of arrow 416

When the edge 415 starts to move across the light sensitive areas 190-1, 190-2, 190-3, 190-4 from the right hand side, at first the second and fourth pixel circuits with the light sensitive areas 190-2, 190-4 have reasonable likelihood to generate a pixel-off event, but due to noise this does not necessarily have to happen, whereas the first and third pixel circuits with the light sensitive areas 190-1, 190-3 have reasonable likelihood to generate no pixel events, but again, due to noise this does not necessarily have to happen.

Later, when the edge 415 approximates the illustrated position, the second and fourth pixel circuits with the light sensitive areas 190-2, 190-4 have reasonable likelihood to generate no pixel event, but provided that at least one of the second and fourth pixel circuits with the light sensitive areas 190-2, 190-4 has detected a pixel-off event and the event processing circuit 210 is active, with reasonable likelihood at least one of the second and fourth pixel circuits with the light sensitive areas 190-2, 190-4 still signals the pixel-off event until the cluster condition for the autozero has been fulfilled, which is typically only after the event detection circuit has detected a cluster event.

When in the following the edge 415 starts to move across the light sensitive areas 190-1, 190-3, the first and third pixel circuits with the light sensitive areas 190-1, 190-3 have reasonable likelihood to generate a pixel-off event. Due to noise this does not necessarily have to happen, but since the second and fourth pixel circuits with the light sensitive areas 190-2, 190-4 have not been reset, there is reasonable likelihood that a sufficient number of the first to fourth pixel circuits signal a pixel-off event. In this way, the type of majority voting described with reference to FIG. 4 increases the likelihood that the event processing circuit 210 outputs a cluster-off event. A change in the imaged scene can be detected more reliably than by means of pixel event signals output separately from the four pixel circuits.

Figure 6:
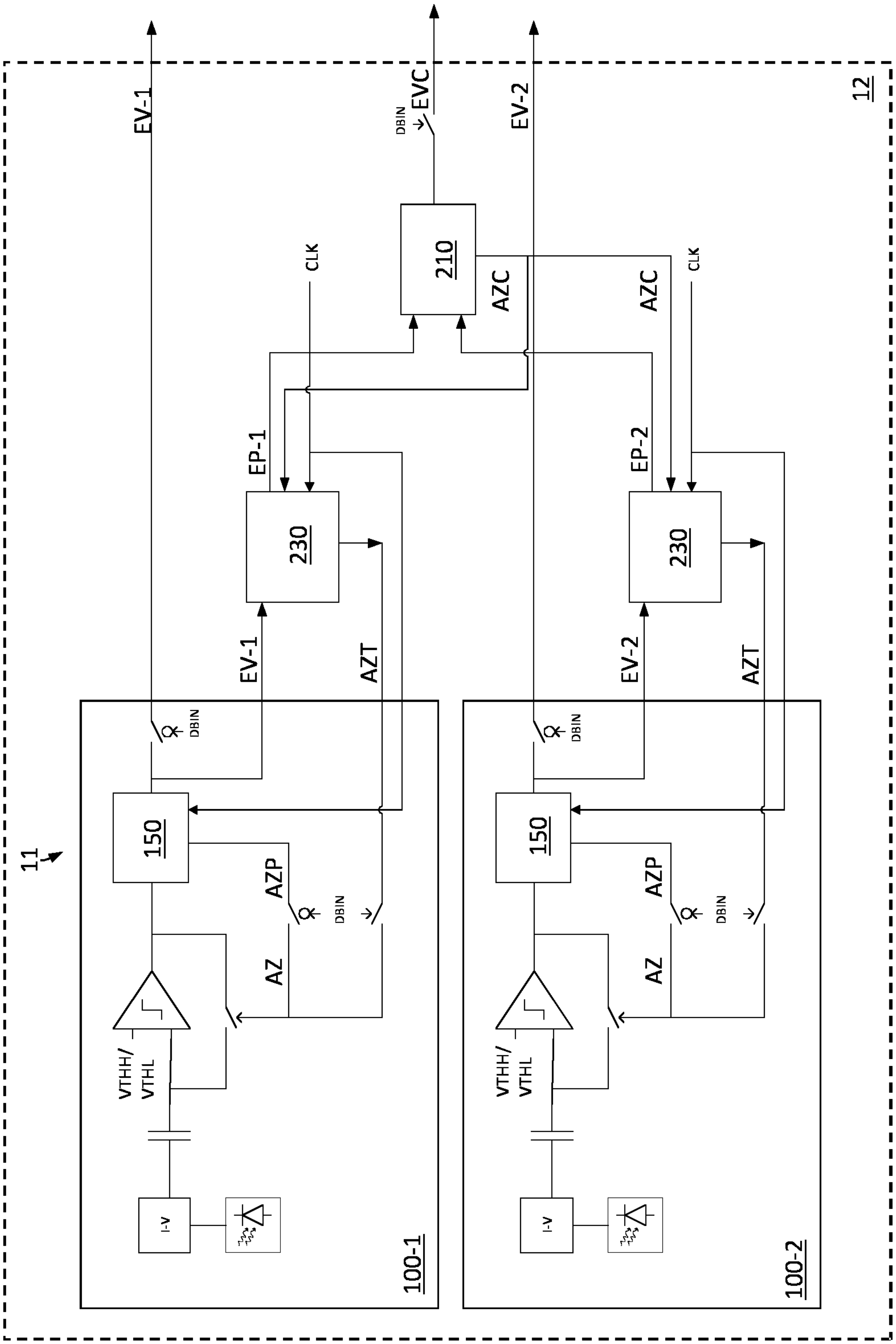
FIG. 6 shows a simplified circuit diagram of a portion of an image sensor including an event processing circuit according to an embodiment concerning spatiotemporal filtering.

In FIG. 6 the event processing circuit 210 does not directly receive the pixel event information EV-1, EV-2 output by the pixel circuits 100-1, 100-2 but pixel information obtained from the pixel event information EV-1, EV-2. The pixel event information EV output by the pixel circuits 100-1, 100-2 and the pixel information EP received by the event processing circuit 210 are not identical.

In particular, each pixel cluster 11 includes temporal voting circuits 230, wherein each temporal voting circuit 230 generates the pixel information EP of a pixel circuit 100 by digitally filtering the pixel event information EV output by the pixel circuit 100.

Each temporal voting circuit 230 receives the pixel event information EV-1, EV-2 at an input, processes the pixel event information EV-1, EV-2 and outputs pixel information EP-1, EP-2 at an output. The pixel information EP-1, EP-2 may include a single bit or may include two or more bits. The number of bits of each pixel information EP-1, EP-2 may be equal to the number of bits in the pixel event information EV-1, EV-2, or higher. The bits or each pixel information EP-1, EP-2 may be output sequentially on the same signal line in a time-multiplex scheme, or synchronously on different signal lines.

The event processing device 210 receives the pixel information EP-1, EP-2 of all temporal voting circuits 230 of the pixel cluster 11 at different inputs, outputs cluster event information EVC, and may output a cluster autozero signal AZC. The temporal voting circuits 230 receive the cluster autozero signal AZC. The cluster autozero signal AZC may reset the temporal voting circuits 230, e.g. may reset internal delay stages and registers of the temporal voting circuits 230.

Each temporal voting circuit 230 is configured to capture multiple pixel event information at different points in time and derive the pixel information EP from pixel event information EV obtained at two or more different points in time.

To this end, the pixel circuit 100 is configured to output pixel event information EV in response to a clock signal CLK.

In particular, the temporal voting circuits 230 and the pixel logic circuits 150 of the pixel circuits 100 receive the clock signal CLK that contains periodic clock pulses. The pixel logic circuits 150 output updated pixel event information EV-1, EV-2 with each clock pulse or with each preset multiple clock pulse. The temporal voting circuits 230 capture new pixel event information EV-1, EV-2 at the rate the pixel logic circuits 150 update the pixel event information EV-1, EV-2.

Each temporal voting circuit 230 resets the voltage differencing circuit 120 of the pixel circuit 100 each time the pixel event information EV fulfills a predefined temporal pixel reset condition.

To this end, the temporal voting circuits 230 receive the cluster autozero signal AZC and generate clock-controlled pixel-specific autozero signals AZT, if the cluster event information and/or the pixel event information EV-1, EV-2 fulfill the predefined temporal pixel reset condition. The start of an active pixel-specific autozero signal AZT may be synchronous with a clock pulse of the clock signal CLK.

Figure 7:
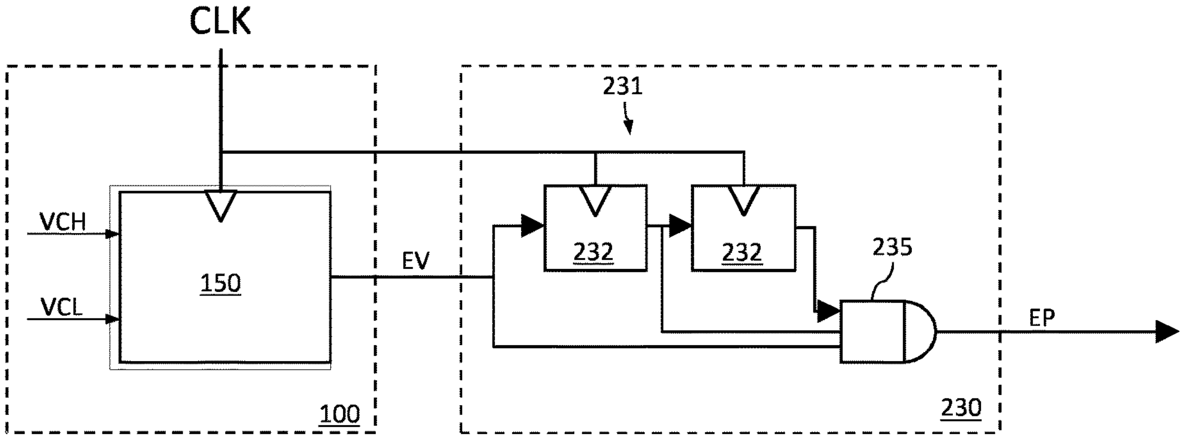
FIG. 7 shows a simplified circuit diagram of a portion of an event processing circuit including delay stages according to an embodiment related to spatiotemporal voting.

FIG. 7 refers to a temporal voting circuit 230 that includes at least one delay stage 232 and a voting logic circuit 235, wherein the at least one delay stage 232 receives at least a part of the pixel event information EV, and wherein the voting logic circuit 235 generates the pixel information EP on the basis of at least the output signal(s) of the at least one delay stage 232.

For example, the temporal voting circuit 230 may include not more than one delay stage 232, wherein the delay stage 232 receives the pixel event information EV and provides one single delayed instance of the pixel event information EV. The voting logic circuit 235 receives the not-delayed instance of the pixel event information and an instance of the pixel event information EV delayed by one clock cycle, wherein one clock cycle may include on clock pulse or a preset multiple of clock pulses.

According to the illustrated example, the temporal voting circuit 230 includes two or more delay stages 232 connected in a serial configuration, e.g., a shift register 231. An active cluster autozero signal AZC and/or a pixel information EP indicating an on-event or off-event resets the delay stages 232.

The illustrated example shows one multi-input AND-gate as an example for the voting logic circuit 235, but the voting logic circuit 235 may include additional or alternative logic circuits as well, or may simply buffer one, some, or all outputs of the delay stages 232.

According to the illustrated example, the temporal voting circuit 230 outputs pixel information EP containing one bit of information obtained from the output of the voting logic circuit 235. Alternatively, the voting logic circuit 235 may output more signals, e.g. signals obtained from different delay stages 232.

The temporal voting circuit 230 may pass the received pixel event information EV from delay stage 232 to delay stage 232 in response to the clock signal CLK.

In the illustrated example, the temporal voting circuit 230 includes a shift register 231 with two delay stages 232, wherein a first one of the delay stages 232 receives the pixel event information EV, and the second one of the delay stages 232 receives the output of the first delay stage 232.

The voting logic circuit 235 receives the not-delayed instance of the pixel event information EV, an instance of the pixel event information EV delayed by one clock cycle, and an instance of the pixel event information EV delayed by two clock cycles.

Figure 8:
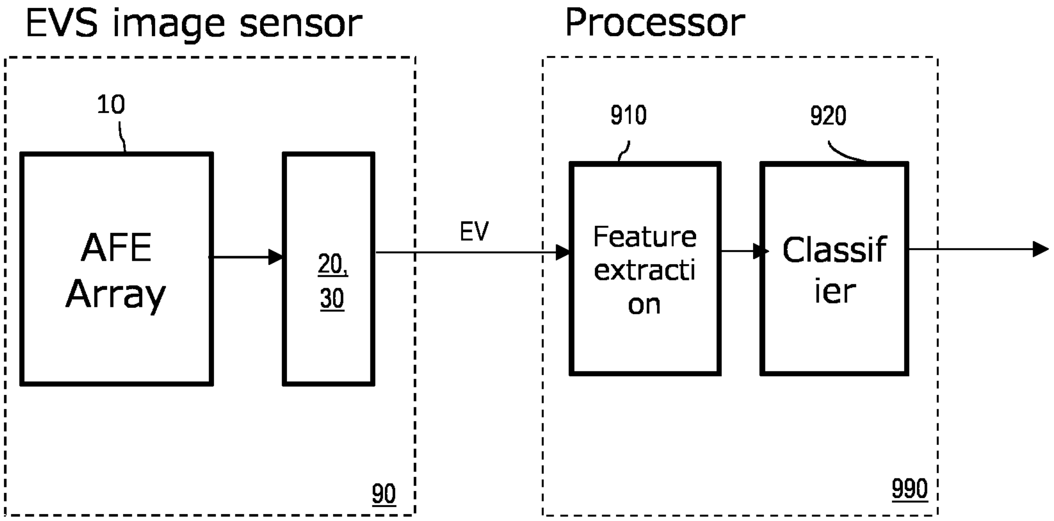
FIG. 8 shows a simplified block diagram of a portion of an image sensor with feature extraction in a downstream image processor for discussing effects of the embodiments related to in-pixel event processing.

FIG. 8 schematically illustrates a conventional approach for feature extraction from captured images for the purpose of illustration. An image sensor 90 for event detection includes a pixel array unit 10. A column readout circuit 20 or a column readout circuit 20 and a row control circuit 30 output pixel event information EV collected in the pixel array unit 10 to a processor 990. The processor 990 includes a feature extraction unit 910 to obtain information about single features in the imaged scene from the pixel event information. The single features may be certain spatiotemporal patterns, e.g., features with common motion vectors. The processor 990 may further include a classifier unit 920 that processes the extracted features and outputs feature recognition results. The feature extraction unit 910 and/or the classifier unit 920 may be realized in hardware, in software, or as a combination of both.

For a pixel array unit 10 with 480*640 pixels (total of 307200 pixels) and a sequential readout of two bits per pixel (pixel-on event and pixel-off event) at a frame rate of 1000 frames per second, data transmission from the EVS image sensor 90 to the processor 990 requires a bit rate of about 614.4 Mbit/s. The sequential readout of two bits including pixel-on events and pixel-off events for each pixel encodes an event image describing a frame with 2-bit encoding per pixel.

Figure 9:
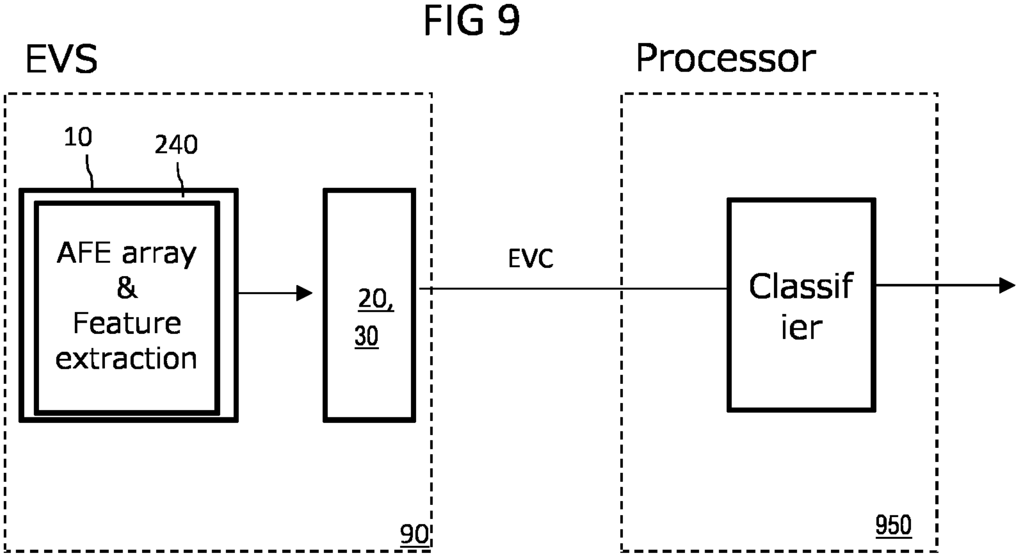
FIG. 9 shows a simplified block diagram of a portion of an image sensor with feature extraction in a pixel array for discussing effects of the embodiments related to in-pixel event processing.

In FIG. 9, the pixel array unit 10 includes event processing circuits 210, wherein each event processing circuit 210 includes a feature extraction circuit 240 that generates cluster feature information on the basis of the received pixel event information EP and that outputs the cluster feature information as the cluster event information EVC or as part of the cluster event information EVC.

The column readout circuit 20 or the column readout circuit 20 and the row control circuit 30 output the cluster event information EVC collected in the pixel array unit 10 to a modified processor 950 without feature extraction unit 910 as required for the example of FIG. 8.

Depending on details of the feature extraction circuits 240, for a pixel array unit 10 with 480*640 pixels and a frame rate of 1000 frames per second, the bitrate for data transmission from the EVS image sensor 90 to the modified processor 950 can be significantly reduced.

Figure 10:
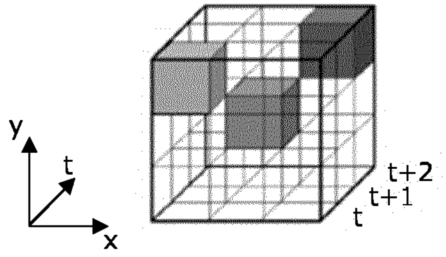
FIG. 10 schematically shows the spatiotemporal arrangement of some mask patterns for feature extraction, and an example for a distribution of count values for various mask patterns for discussing effects of the embodiments related to feature extraction.
Figure 10:
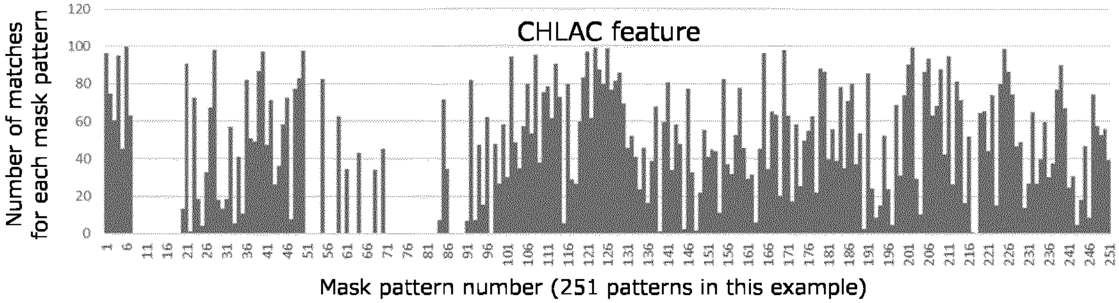
Figure 11:
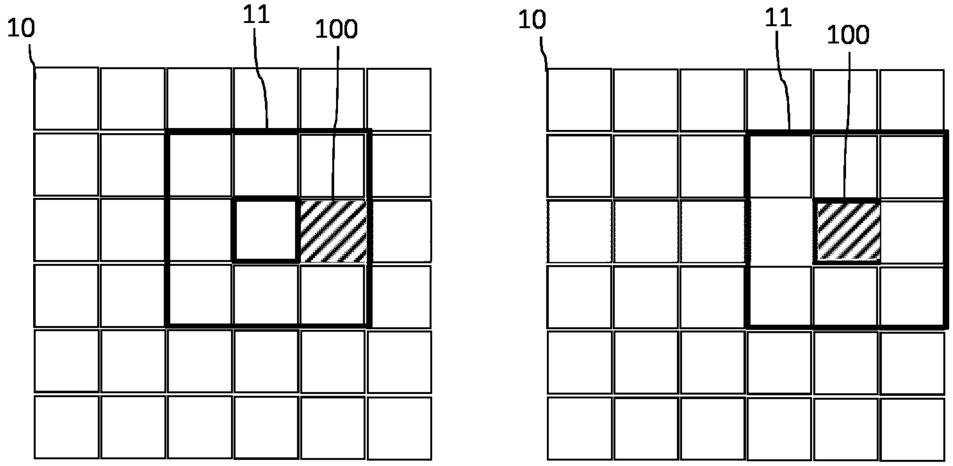
FIG. 11 schematically shows the positions of pixel circuits assigned to a pixel cluster for discussing effects of the embodiments related to in-pixel event processing.

FIG. 10 and FIG. 11 concern local feature extraction based on local spatiotemporal patterns in binarized interframe difference images, such as CHLAC (cubic higher-order local auto-correlation). The motion information is extracted from three consecutive binarized interframe difference images taken at t, t+1, t+2 by obtaining the number of matches to 251 different mask patterns in pixel units of 3×3×3 pixels (3 pixels along pixel column direction×3 pixel along pixel row direction×3 pixel along time axis).

The upper part of FIG. 10 shows one of the 251 different mask patterns in a 3×3×3 pixel unit. The total number of matches is counted for the whole image for each mask pattern. Thus, CHLAC uses a feature that has typically 251 dimensions and the value of each dimension is the total number of matches for the respective mask pattern across the whole image.

The lower part of FIG. 10 shows an example for the total number of matches for some of the mask pattern, wherein each mask pattern is identified by a unique mask pattern number. For image sensors with intensity readout, the CHLAC method needs preprocessing of RGB images to obtain the binarized interframe difference images.

Instead, the image sensor 90 for event detection as illustrated in FIG. 9, when operated with a sequential readout (e.g. row-by-row readout) instantaneously delivers the binarized interframe differences without further preprocessing. Feature extraction can be used to reduce overall power consumption in a camera system including an image sensor and a processor for feature recognition.

FIG. 11 shows two different 3×3 pixel clusters 11-1, 11-2 of a pixel array unit 10 as used for feature extraction. The shaded pixel 100 is part of both illustrated pixel clusters 11-1, 11-2. Each pixel 100 is part of nine different, overlapping 3×3 pixel clusters.

Figure 12:
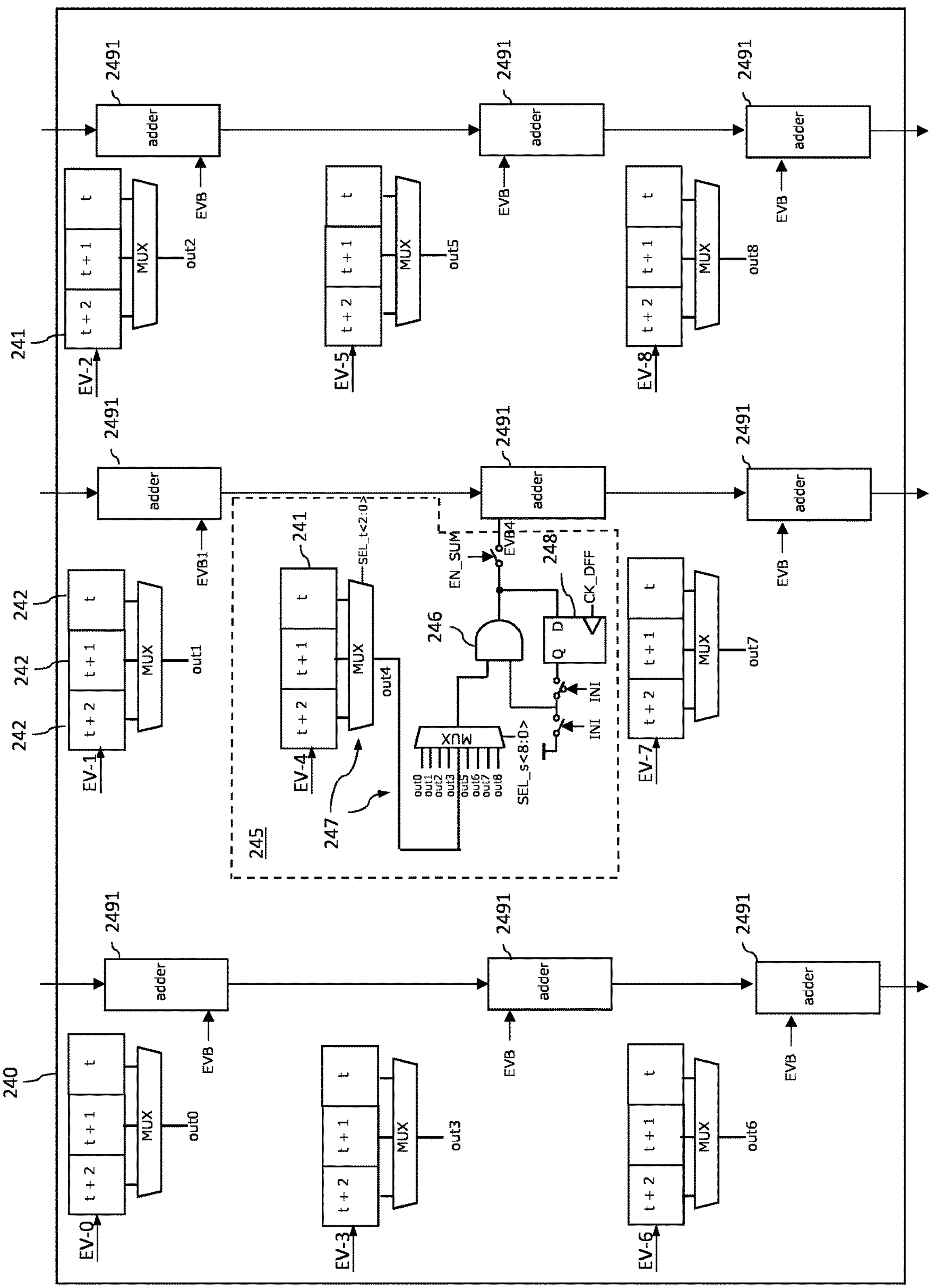
FIG. 12 shows a schematic, simplified circuit diagram of an event processing circuit for feature extraction according to an embodiment.

FIG. 12 shows a feature extraction circuit 240 that includes a temporal register 241 and a filter circuit 245 for each of the pixel circuits 100 of the pixel cluster 11. Each temporal register 241 includes at least one delay stage, for example, at least two delay stages 242 connected in series, wherein a first one of the delay stages 242 receives at least a part of the pixel event information EV-0, EV-1, . . . of a pixel circuit 100. The filter circuit 245 includes a logical conjunction operation circuit 246 configured to output a filter output signal EVB, multiplexer circuits 247 configured to select an output of at least one delay stage 242 of at least one temporal register 241 of at least one of the pixel circuits 100 of the pixel cluster 11 to be signal-connected to a first input of the logical conjunction operation circuit 246, and a flip-flop circuit 248, wherein an input of the flip-flop circuit 248 is electrically connected to an output of the logical conjunction operation circuit 246 and wherein an output of the flip-flop circuit 248 is electrically connected to a second input of the logical conjunction operation circuit 246.

In particular, the illustrated embodiment refers to a pixel cluster 11 including nine directly adjacent pixel circuits 100 in three direct adjacent pixel columns and three direct adjacent pixel rows, and temporal registers 241 including exactly three delay stages 242 for obtaining, for each of the nine pixel signals EV-0, . . . , EV-8 three instances indicated by the indices t, t+1, t+2. Alternately, the temporal registers 241 may exactly two delay stages 242 for obtaining two instances indicated by the indices t+1, t+2, wherein the filter circuit 245 further receives the current pixel event information indicated by index t.

The feature extraction circuit 240 further includes an adder circuit 249 for combining the filter output signals EVB of the filter circuits 245 of the pixel circuits 100 of the pixel cluster 11.

In particular, the adder circuit 249 may include a plurality of identical pixel adder units 2491, wherein each adder unit 2491 adds the filter output signal of one of the filter circuits 245 to the result of the preceding adder unit 249-1 of the same pixel column along a pixel column direction.

Judgement of a match to a mask pattern is conducted by pixel-parallel AND operation in time direction, and the adder circuit 249 counts the number of matches across the pixel array.

Figure 13:
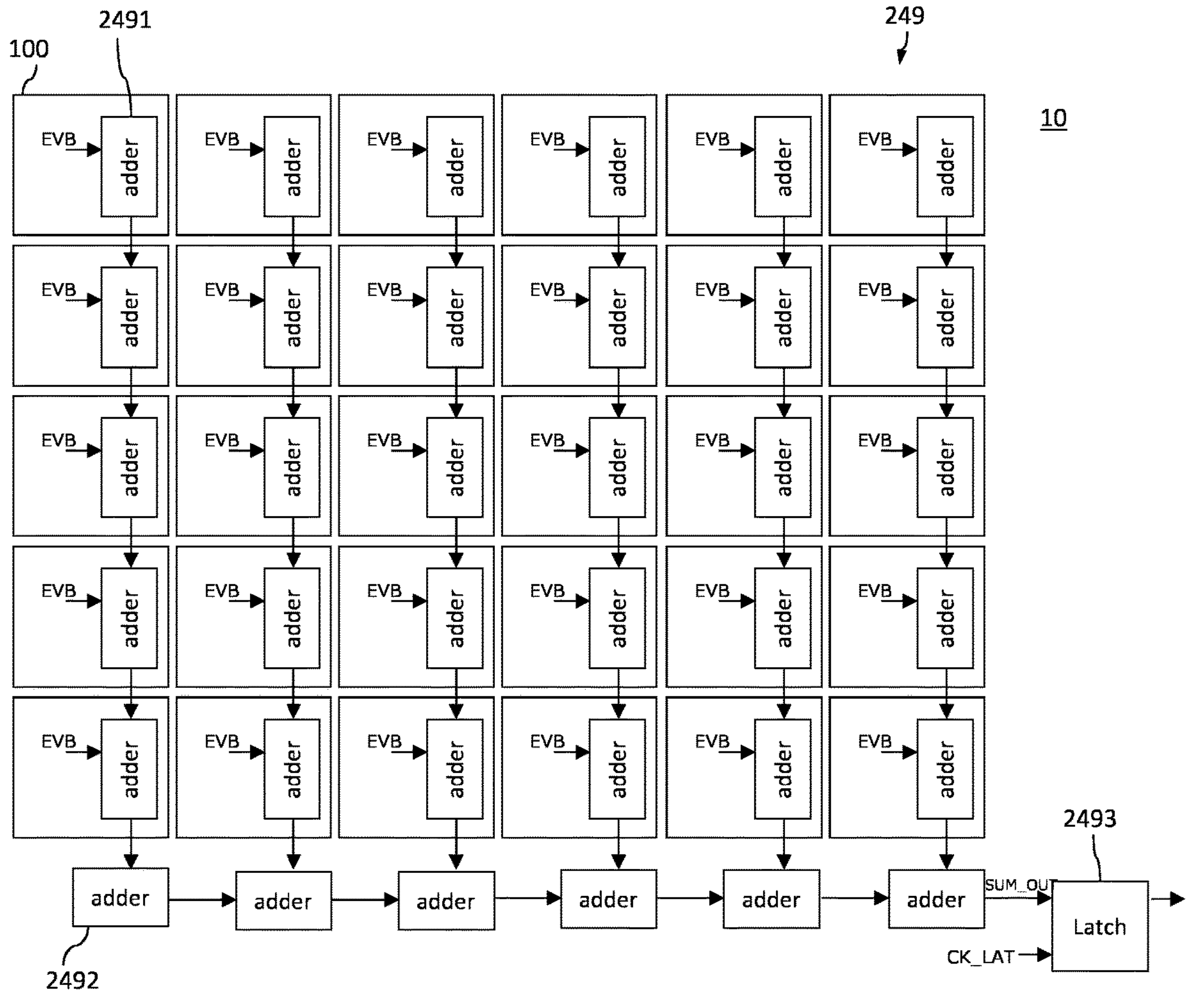
FIG. 13 shows a schematic, simplified block diagram of an adder circuit for an event processing circuit according to an embodiment.

FIG. 13 shows an example of an adder circuit 249 that includes a pixel adder unit 2491 for each pixel circuit 100, a column adder unit 2492 for each pixel column, and a latch 2493. Each column adder unit 2492 receives the sum of the filter output signals of one pixel column and adds up the received sum with the sum obtained from the filter output signals of the preceding pixel columns in the pixel row direction. The latch 2493 latches the total sum of filter output signals EVB across the pixel array unit 10. The adder circuit 240 is completely configured as digital circuit.

Figure 14:
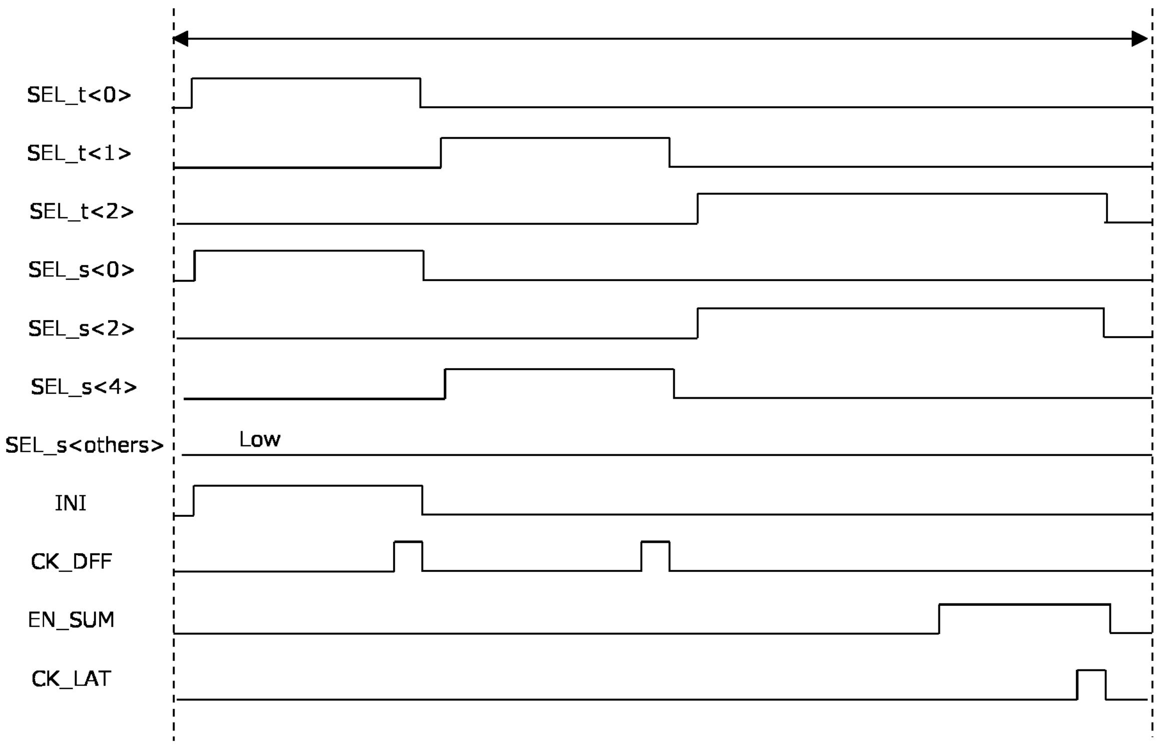
FIG. 14 shows a simplified time diagram of control signals for the event processing circuit of FIG. 12 combined with the adder circuit of FIG. 13 according to an embodiment.
Figure 14:
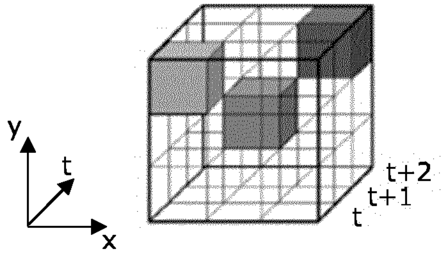

FIG. 14 shows a timing chart of one cycle Cyc to extract the number of matches to a mask pattern for the feature extraction circuit 240 of FIG. 12 in combination with the adder circuit 249 of FIG. 13.

Figure 15:
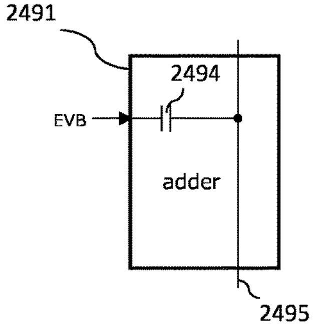
FIG. 15 shows a schematic, simplified circuit diagram of a pixel adder unit of an adder circuit according to an embodiment.

FIG. 15 shows an example of a pixel adder unit 2491 including a capacitor 2494 electrically connected between the output of the filter circuit 245 and a column filter output line 2495. The capacitor 2494 performs a digital-to-analog conversion of the filter output signal EVB and facilitates summation of all filter output signals EVB capacitively coupled to the same column filter output line 2495.

Figure 16:
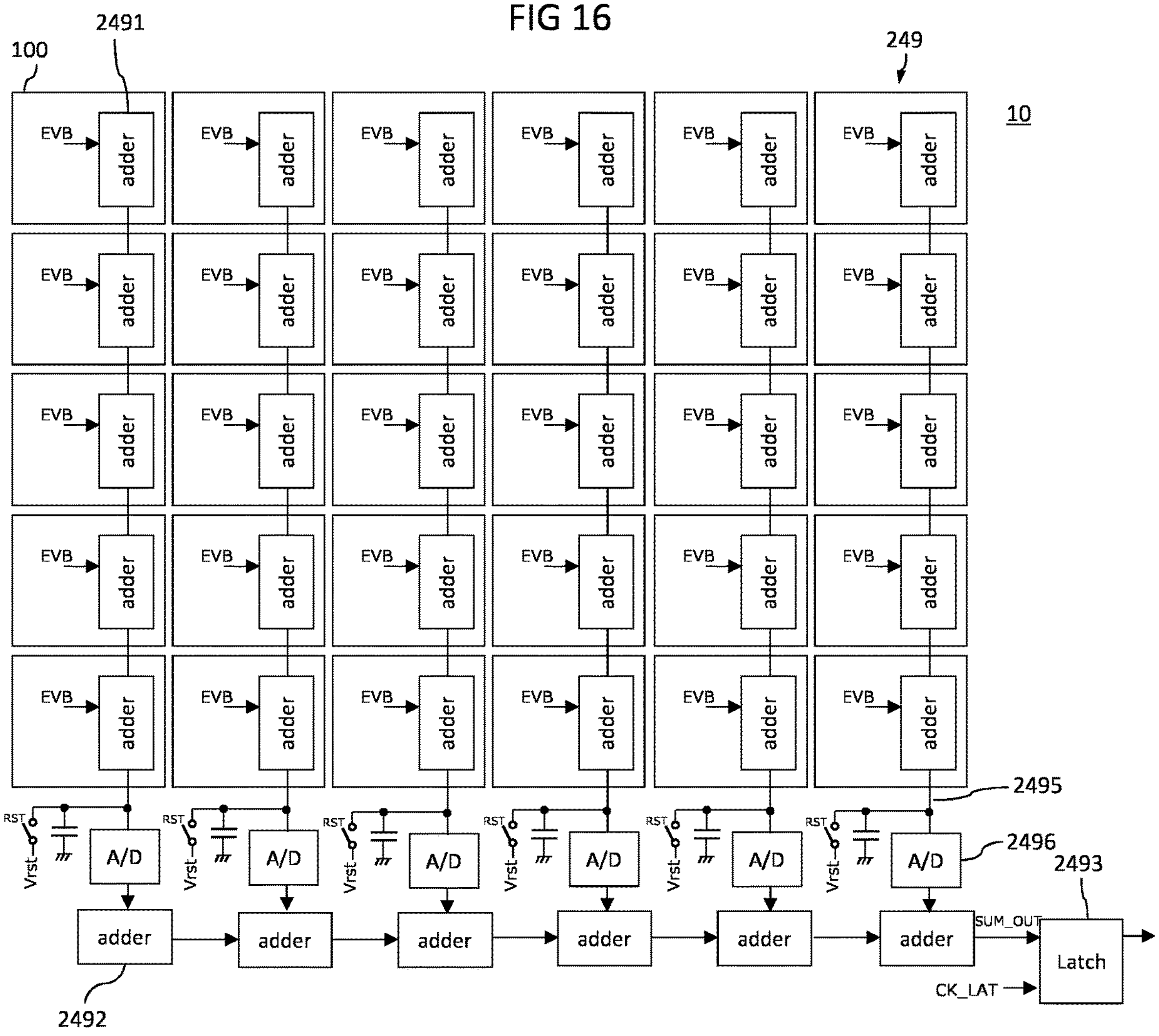
FIG. 16 shows a schematic, simplified block diagram of an adder circuit for an event processing circuit according to an embodiment related to a partial sum up in the analog domain.

In FIG. 16, the pixel array unit 10 includes a plurality of pixel adder units 2491 and an analog-to-digital conversion unit 2496 for each pixel column. Each adder unit 2491 includes a capacitor 2494 electrically connected between the output of the filter circuit 245 and a column filter output line 2495. Each analog-to-digital conversion unit 2496 converts an analog sum signal on the column filter output line 2495 into a digital column sum.

The pixel adder units 2491 sum up the filter output signals EVC on each column filter output line 2495 in the analog domain. The analog-to-digital conversion units 2496 converts the analog sum signals on the column filter output lines 2495 into digital column sums. Digital column adder units 2492 as described with reference to FIG. 13 sum up the digital column sums, and the latch 2493 latches the total sum of filter output signals across the pixel array unit 10. Transmitting the filter output signals EVC in the analog domain reduces the area required for the portions of the adder circuit 249 within the pixel array unit 10.

Figure 17:
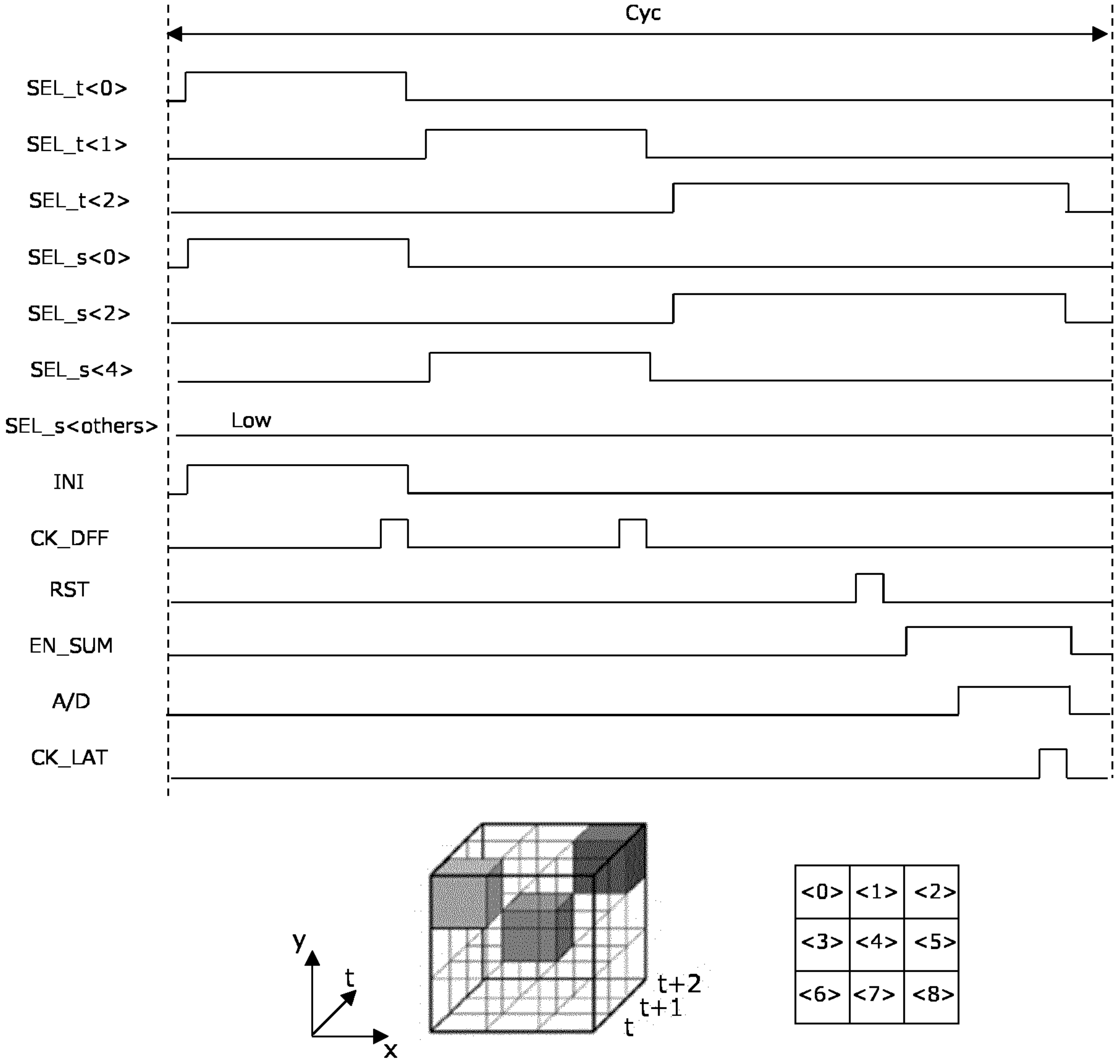
FIG. 17 shows a simplified time diagram of control signals for the event processing circuit of FIG. 12 combined with the adder circuit of FIG. 16 according to an embodiment.

FIG. 17 shows a timing chart of one cycle Cyc to extract the number of matches to a mask pattern for the feature extraction circuit 240 of FIG. 16 in combination with the adder circuit 249 of FIG. 15.

At least one of the multiplexer circuits 247 is controllable by select signals received from outside the pixel array unit 10, so that the feature extraction circuit 240 is reconfigurable by controlling signal levels of the select signals.

In FIG. 12 both multiplexer circuits 247 are controllable by select signals SEL_t<2:0> and SEL_s<8:0> received from outside the pixel array unit 10. The select signals SEL_t<2:0> and SEL_s<8:0> allow a simulation model or a learning model to optimize the results of feature recognition, and may extend the range of the mask patterns to beyond that 251 mask patterns usually applied in typical CHLAC methods.

A method of reconfiguring the event processing circuit includes generating a simulation model of the image sensor, wherein the simulation model of the image sensor includes a parametrized model for event processing circuits. The method further includes determining circuit parameters of the parametrized model for event processing circuits by minimizing a predefined cost function for pixel event information EV and/or cluster event information EVC obtained by illuminating the image sensor, and reconfiguring the event processing circuits according to the circuit parameters determined by minimizing the predefined cost function. Determining the circuit parameters of the parametrized model for event processing circuits may use an artificial intelligence algorithm.

Figure 18:
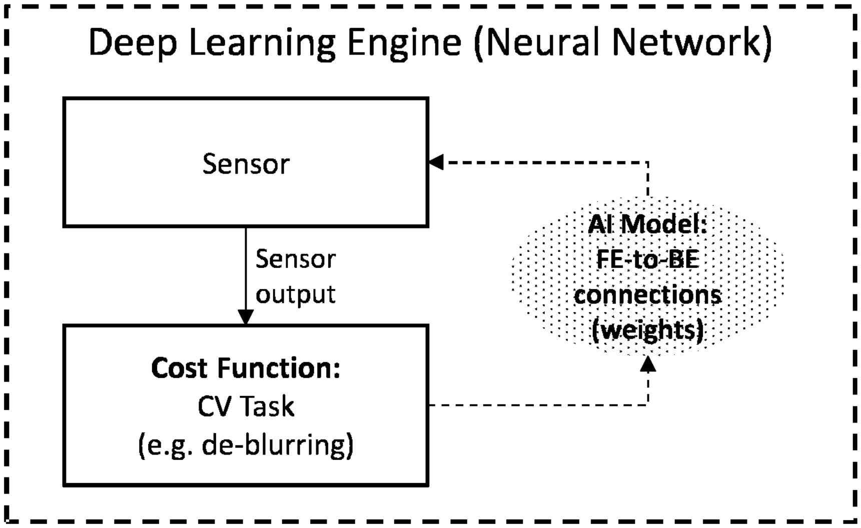
FIG. 18 shows a schematic block diagram for a reconfiguration method for an event processing circuit according to an embodiment using an on-the-go trained simulation model.

In FIG. 18, the artificial intelligence algorithm outputs updated weights and/or thresholds which the event processing circuit and/or the temporal voting circuits use for processing the pixel event information received from the pixel circuits of the pixel cluster. The event processing circuits receive the updated weights and/or thresholds and replace the formerly used weights and/or thresholds with the new weights and/or thresholds.

In case the event processing circuit includes a feature extraction circuit with a filter circuit including multiplexers with controllable select inputs, the event processing circuits may be reconfigured by controlling select signals connected to the select inputs of the multiplexers.

A method of manufacturing an image sensor includes generating a simulation model of the image sensor, wherein the simulation model of the image sensor includes a parametrized model for event processing circuits. The method further includes determining circuit parameters of the parametrized model for event processing circuits by minimizing a cost function for a dataset representing illumination conditions of an application of interest, and providing the image sensor including event processing circuits defined by the determined circuit parameters. Determining the circuit parameters of the parametrized model for the event processing circuits may use an artificial intelligence algorithm.

Figure 19:
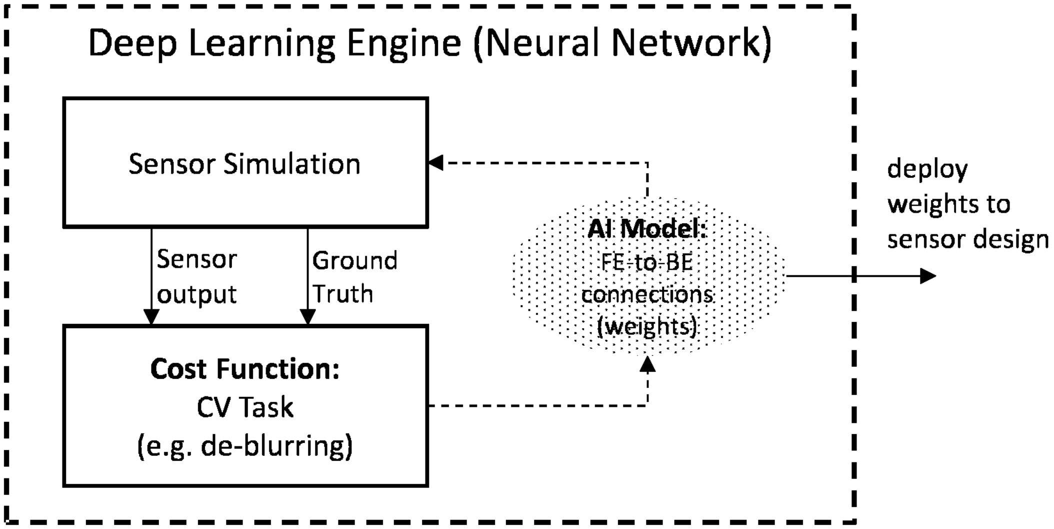
FIG. 19 shows a schematic block diagram for a configuration method for an event processing circuit for feature extraction according to an embodiment using a pre-trained simulation model.

In FIG. 19, the artificial intelligence algorithm calculates weights which the event processing circuit and/or the temporal voting circuits use for processing the pixel event information received from the pixel circuits of the pixel cluster. The calculated weights are implemented in the event processing circuit by design.

In case the event processing circuits include a feature extraction circuit with a filter circuit including multiplexers with controllable select inputs, determining the circuit parameters of the parametrized model may include determining signal levels of select signals applied to the select inputs of the multiplexers.

Figure 20:
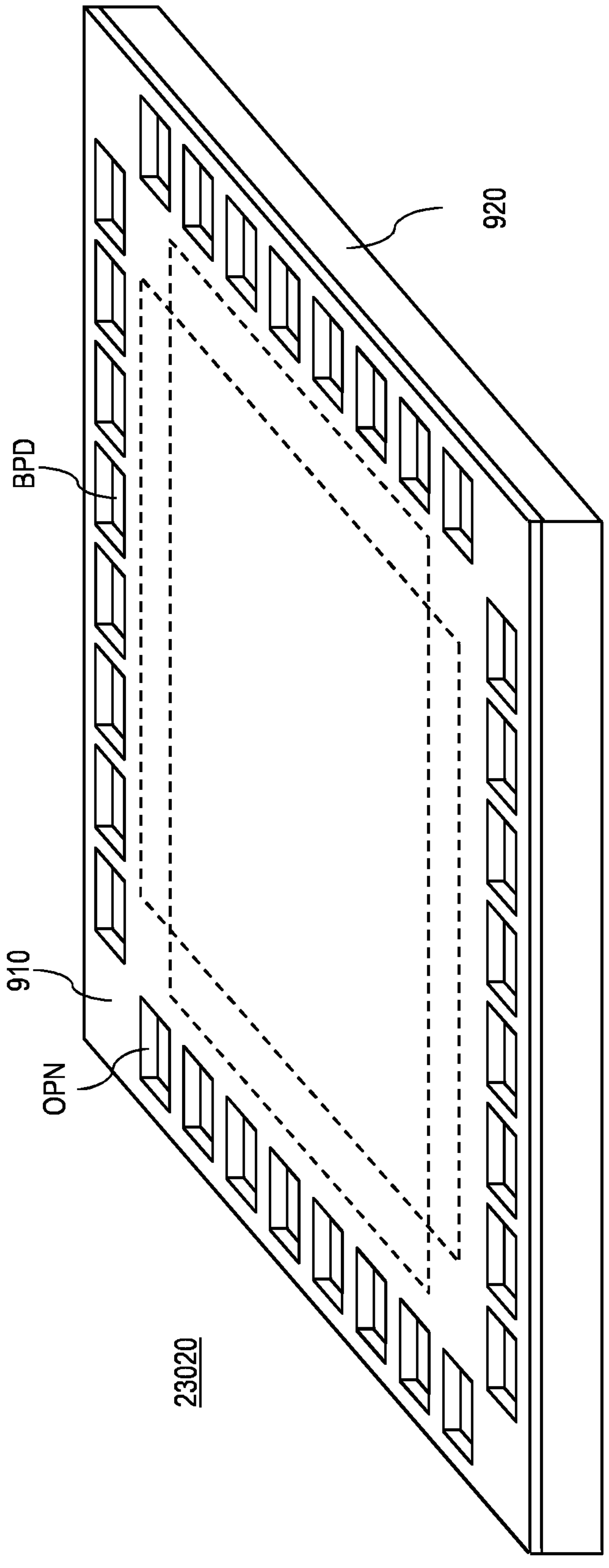
FIG. 20 shows a perspective view of an example of a laminated structure of an image sensor according to an embodiment of the present disclosure.

FIG. 20 is a perspective view showing an example of a laminated structure of a solid-state imaging device 23020 with a plurality of pixels arranged matrix-like in array form. Each pixel includes at least one photoelectric conversion element.

The solid-state imaging device 23020 has the laminated structure of a first chip (upper chip) 910 and a second chip (lower chip) 920.

The laminated first and second chips 910, 920 may be electrically connected to each other through TC(S) Vs (Through Contact (Silicon) Vias) formed in the first chip 910.

The solid-state imaging device 23020 may be formed to have the laminated structure in such a manner that the first and second chips 910 and 920 are bonded together at wafer level and cut out by dicing.

In the laminated structure of the upper and lower two chips, the first chip 910 may be an analog chip (sensor chip) including at least one analog component of each pixel circuit, e.g., the photoelectric conversion elements arranged in array form.

For example, the first chip 910 may include only the photoelectric conversion elements of the pixel circuits as described above with reference to the preceding FIGS. Alternatively, the first chip 910 may include further elements of each pixel circuit. For example, the first chip 910 may include each element of the pixel circuit.

The second chip 920 may be mainly a logic chip (digital chip) that includes the elements complementing the elements on the first chip 910 to complete pixel circuits and current control circuits. The second chip 920 may also include analog circuits, for example circuits that quantize analog signals transferred from the first chip 910 through the TCVs.

The second chip 920 may have one or more bonding pads BPD and the first chip 910 may have openings OPN for use in wire-bonding to the second chip 920.

The solid-state imaging device 23020 with the laminated structure of the two chips 910, 920 may have the following characteristic configuration:

The electrical connection between the first chip 910 and the second chip 920 is performed through, for example, the TCVs. The TCVs may be arranged at chip ends or between a pad region and a circuit region. The TCVs for transmitting control signals and supplying power may be mainly concentrated at, for example, the four corners of the solid-state imaging device 23020, by which a signal wiring area of the first chip 910 can be reduced.

Figure 21:
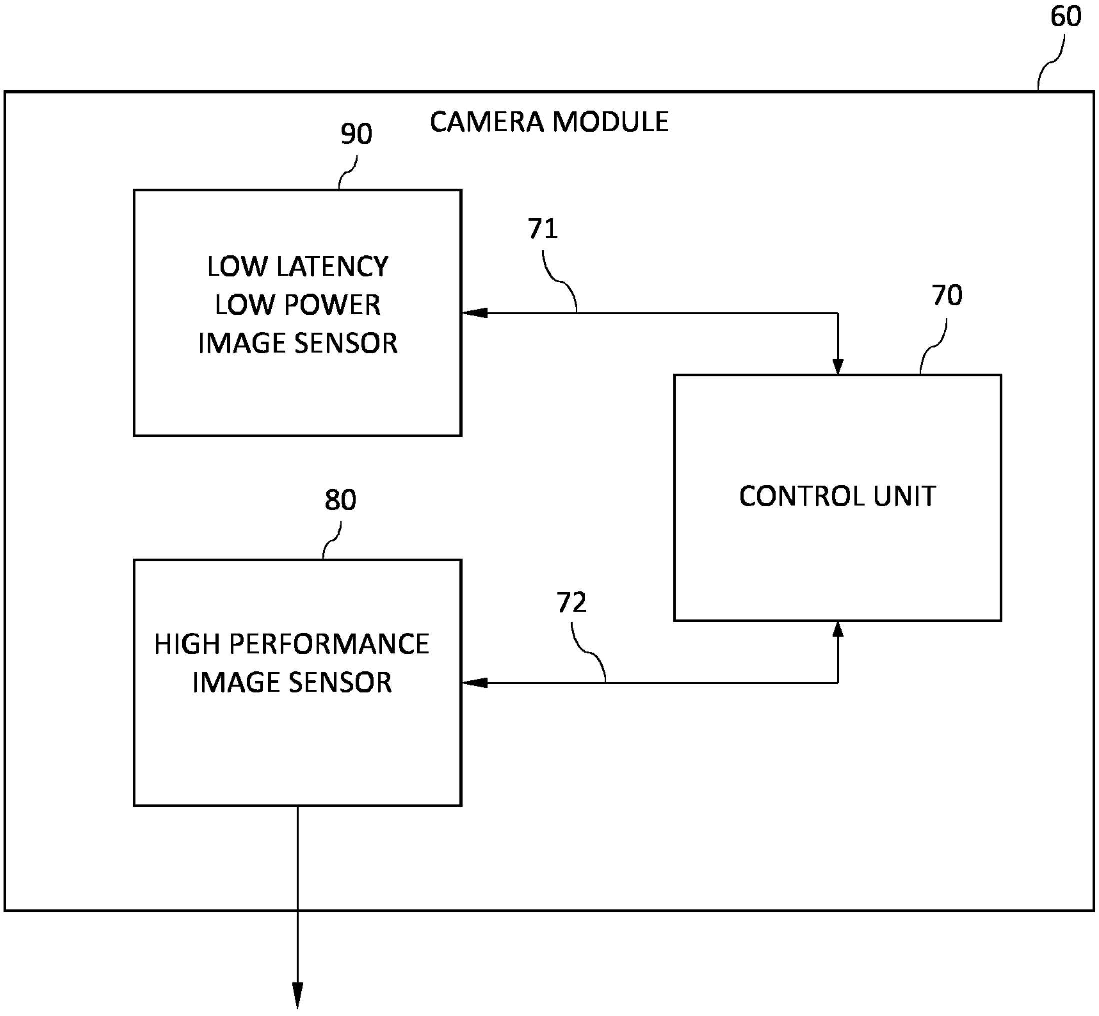
FIG. 21 shows a block diagram showing a schematic configuration of an embodiment of the present disclosure directed to a camera module having a low-latency, low-power image sensor for controlling a high-performance image sensor.

FIG. 21 shows a camera module 60 that includes a control unit 70, a low latency, low power image sensor 90, and a high performance image sensor 90. Power consumption of the low power image sensor 90 is significantly lower than in the high performance image sensor 90. The low power image sensor 90 may include pixel clusters with event processing circuits as described above.

For a low power mode of the camera module 70, the controller unit 70 turns on the low power image sensor 90 and turns off the high performance image sensor 90. The low power image sensor 90 may scan a scene and detects changes in the scene with high robustness against noise. When the low power image sensor 90 detects a significant change in the scene, the controller 70 receives reliable pixel event information and controls the high performance image sensor 80 to turn on.

Figure 22:
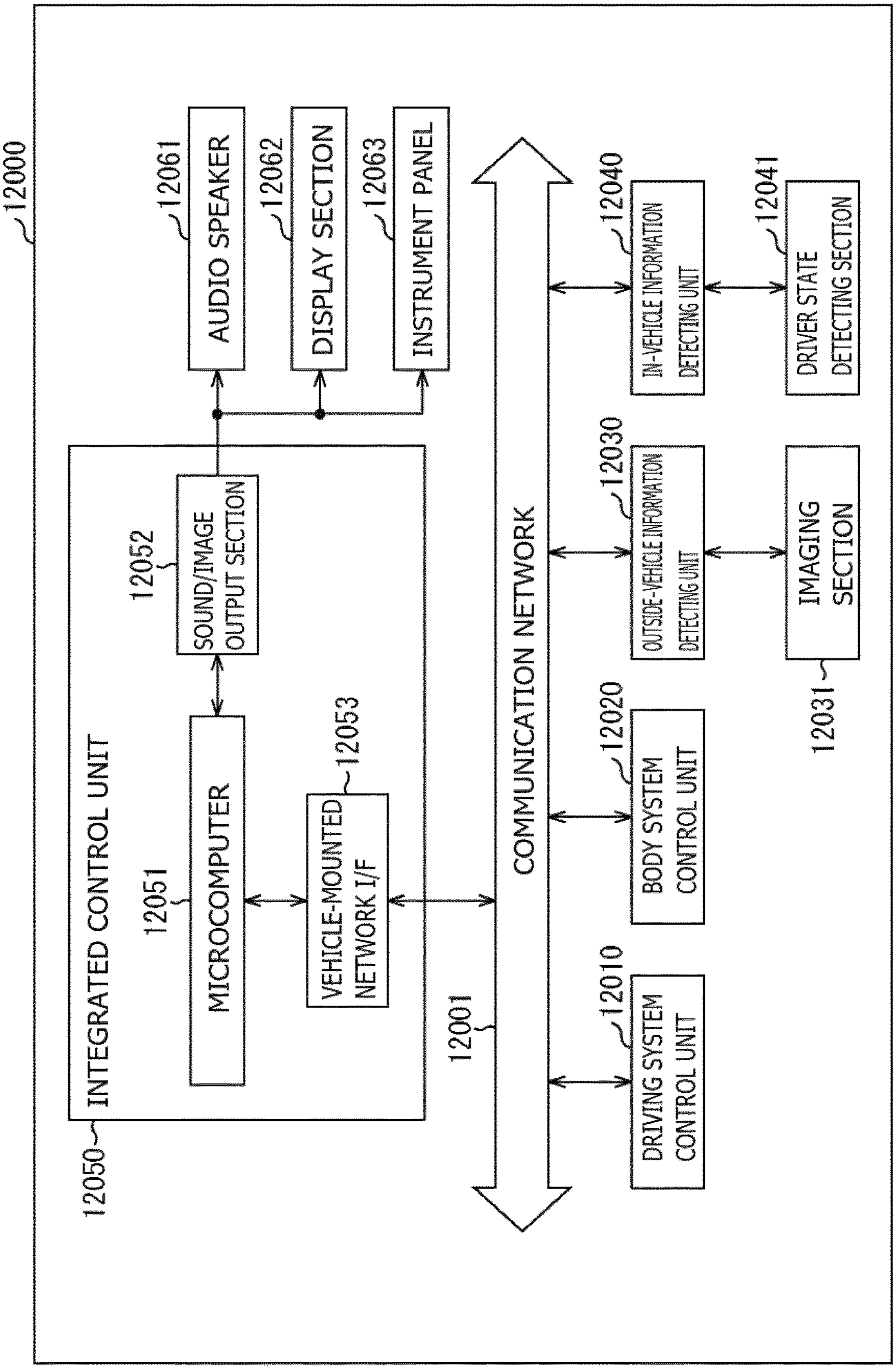
FIG. 22 shows a schematic block diagram depicting an example of a schematic configuration of a vehicle control system.

FIG. 22 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 22, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may be or may include an image sensor with event processing circuits integrated in a pixel array unit according to the embodiments of the present disclosure. The light received by the imaging section 12031 may be visible light, or may be invisible light such as infrared rays or the like.

The in-vehicle information detecting unit 12040 detects information about the inside of the vehicle and may be or may include an image sensor with event processing circuits integrated in a pixel array unit according to the embodiments of the present disclosure. The in-vehicle information detecting unit 12040 is, for example, connected with a driver state detecting section 12041 that detects the state of a driver. The driver state detecting section 12041, for example, includes a camera that includes a solid-stage imaging device and that is focused on the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 22, an audio speaker 12061, a display section 12062, and an instrument panel 12063 are illustrated as the output device. The display section 12062 may, for example, include at least one of an on-board display or a head-up display.

Figure 23:
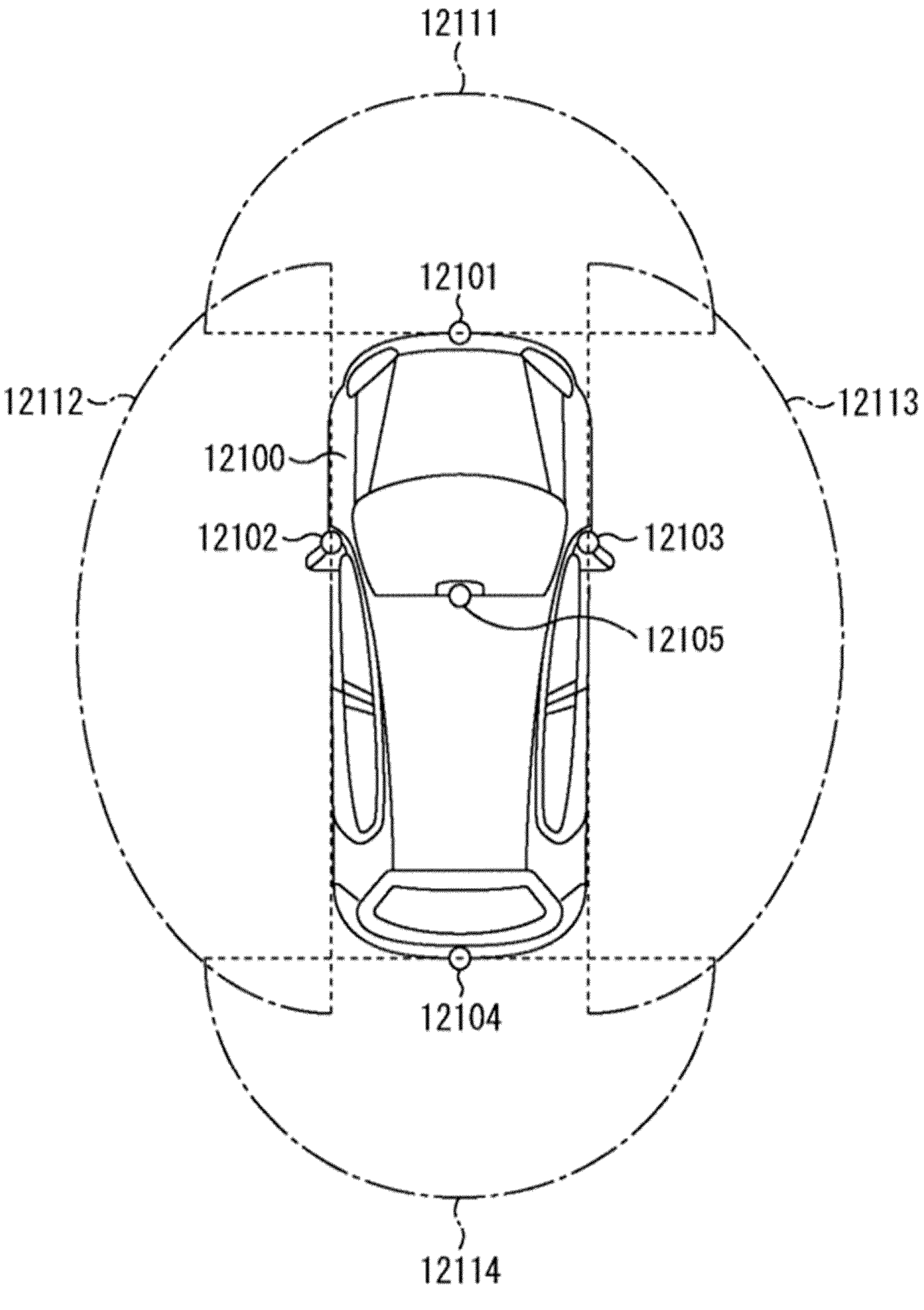
FIG. 23 shows a diagram of assistance in explaining an example of installation positions of an outside-vehicle information detecting section and an imaging section of the vehicle control system of FIG. 22.

FIG. 23 is a diagram depicting an example of the installation position of the imaging section 12031, wherein the imaging section 12031 may include imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 23 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, imaging element having pixels for phase difference detection or may include a ToF module including an image sensor with event processing circuits integrated in a pixel array unit according to the embodiments of the present disclosure.

For example, the microcomputer 12051 can determine a distance to each three-dimensional object within the imaging ranges 12111 to 12114 and a temporal change in the distance (relative speed with respect to the vehicle 12100 on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. By applying an image sensor with event processing circuits integrated in a pixel array unit according to the embodiments of the present disclosure, the electric power can be saved.

Additionally, embodiments of the present technology are not limited to the above-described embodiments, but various changes can be made within the scope of the present technology without departing from the gist of the present technology.

The image sensor according to the present disclosure may be any device used for analyzing and/or processing radiation such as visible light, infrared light, ultraviolet light, and X-rays. For example, the image sensor may be any electronic device in the field of traffic, the field of home appliances, the field of medical and healthcare, the field of security, the field of beauty, the field of sports, the field of agriculture, the field of image reproduction or the like.

Specifically, in the field of image reproduction, the image sensor may be a device for capturing an image to be provided for appreciation, such as a digital camera, a smart phone, or a mobile phone device having a camera function. In the field of traffic, for example, the image sensor may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the image sensor may be integrated in any type of sensor that can be used in devices provided for home appliances such as TV receivers, refrigerators, and air conditioners to capture gestures of users and perform device operations according to the gestures. Accordingly the image sensor may be integrated in home appliances such as TV receivers, refrigerators, and air conditioners and/or in devices controlling the home appliances. Furthermore, in the field of medical and healthcare, the image sensor may be integrated in any type of sensor, e.g. an image sensor, provided for use in medical and healthcare, such as an endoscope or a device that performs angiography by receiving infrared light.

In the field of security, the image sensor can be integrated in a device provided for use in security, such as a monitoring camera for crime prevention or a camera for person authentication use. Furthermore, in the field of beauty, the image sensor can be used in a device provided for use in beauty, such as a skin measuring instrument that captures skin or a microscope that captures a probe. In the field of sports, the image sensor can be integrated in a device provided for use in sports, such as an action camera or a wearable camera for sport use or the like.

Furthermore, in the field of agriculture, the image sensor can be used in a device provided for use in agriculture, such as a camera for monitoring the condition of fields and crops.

The present technology can also be configured as described below:

(1) An image sensor, including: a plurality of pixel clusters, wherein each pixel cluster includes a number L of pixel circuits, wherein each pixel circuit is configured to output pixel event information, and wherein the pixel event information indicates whether or not a change of radiation intensity received by the pixel circuit exceeds a positive threshold value and whether or not the change of the radiation intensity received by the pixel circuit falls below a negative threshold value, and an event processing circuit configured to receive pixel information EP based on the pixel event information of the pixel circuits of a pixel cluster and to generate cluster event information indicating whether or not the pixel information of the L pixel circuits fulfills a predefined cluster output condition.

(2) The image sensor according to (1), wherein each pixel circuit includes a pixel photocurrent circuit configured to output a pixel voltage signal, wherein a voltage level of the pixel voltage signal is a function of incoming light intensity, a voltage differencing circuit configured to generate a shifted pixel signal by shifting a voltage level of the pixel voltage signal by an amount determined by a voltage level of the pixel voltage signal at a reset time, and a pixel logic circuit configured to output the pixel event information based on a result of comparisons of the shifted pixel signal with an upper threshold voltage and a lower threshold voltage (VTHL).

(3) The image sensor according to (2), wherein the event processing circuit is configured to reset the voltage differencing circuit each time the pixel information received from the pixel circuits of a pixel cluster fulfills a predefined pixel reset condition.

(4) The image sensor according to any of (2) and (3), further including a switchover circuit configured to switch control of a reset of the voltage differencing circuit between the pixel logic circuit and the event processing circuit.

(5) The image sensor according to any of (2) to (4), wherein the event processing circuit is configured to reset the voltage shift circuit and/or to generate cluster event information indicating that the pixel information of the L pixel circuits fulfills the predefined cluster output condition, if a majority of the pixel circuits of the pixel cluster output pixel event information indicating a pixel-on event and/or if a majority of the pixel circuits of the pixel cluster output pixel event information indicating a pixel-off event.

(6) The image sensor according to any of (1) to (5), wherein for each pixel circuit the pixel information and the pixel event information are identical.

(7) The image sensor according to any of (1) to (5), further including temporal voting circuits, wherein each temporal voting circuit is configured to generate the pixel information of a pixel circuit by digitally filtering the pixel event information output by the pixel circuit.

(8) The image sensor according to (7), wherein each temporal voting circuit is configured to reset the voltage differencing circuit each time the pixel event information fulfills a predefined temporal pixel reset condition.

(9) The image sensor according to any of (7) to (8), wherein each temporal voting circuit includes at least one delay stage and a voting logic circuit, wherein a first one of the at least one delay stages is configured to receive at least a part of the pixel event information, and wherein the voting logic circuit is configured to generate the pixel information on the basis of at least the output signal(s) of the at least one delay stage.

(10) The image sensor according to (9), wherein the temporal voting circuit is configured to pass the received pixel event information from delay stage to delay stage in response to a clock signal.

(11) The image sensor according to (10), wherein the pixel circuit is configured to output pixel event information in response to the clock signal.

(12) The image sensor according to any of (1) to (11), wherein the event processing circuit includes a feature extraction circuit configured to generate cluster feature information on the basis of the received pixel event information and to output the cluster feature information as the cluster event information or as part of the cluster event information.

(13) The image sensor according to (12), wherein the feature extraction circuit includes a temporal register and a filter circuit for each of the pixel circuits of the pixel cluster, wherein each temporal register includes at least one delay stage, wherein the delay stage or a first one of the delay stages is configured to receive at least a part of the pixel event information of a pixel circuit, and wherein the filter circuit includes a logical conjunction operation circuit configured to output a filter output signal, multiplexer circuits configured to select an output of at least one delay stage of at least one temporal register of at least one of the pixel circuits of the pixel cluster to be signal-connected to a first input of the logical conjunction operation circuit, and a flip-flop circuit, wherein an input of the flip-flop circuit is electrically connected to an output of the logical conjunction operation circuit and wherein an output of the flip-flop circuit is electrically connected to a second input of the logical conjunction operation circuit.

(14) The image sensor according to (13), wherein the feature extraction circuit further includes an adder circuit for combining filter output signals of the filter circuits of the pixel circuits of the pixel cluster.

(15) The image sensor according to (14), wherein the adder circuit includes a plurality of pixel adder units and an analog-to-digital conversion unit for each pixel column, wherein each adder unit includes a capacitor electrically connected between the output of the filter circuit and a column filter output line, and wherein each analog-to-digital conversion unit converts an analog sum signal on the column filter output line into a digital column sum.

(16) The image sensor according to any of (13) to (15), wherein at least one of the multiplexer circuits is controllable by select signals received from outside the pixel array unit, so that the event processing circuit is reconfigurable by controlling signal levels of the select signals.

The invention claimed is:

1. An image sensor, comprising:

a pixel array unit including a plurality of pixel clusters, wherein each pixel cluster includes a number L of pixel circuits, wherein each pixel circuit is configured to output pixel event information, and wherein the pixel event information indicates whether or not a change of radiation intensity received by the pixel circuit exceeds a positive threshold value and whether or not the change of the radiation intensity received by the pixel circuit falls below a negative threshold value, and an event processing circuit configured to receive pixel information based on the pixel event information of the pixel circuits of a pixel cluster and to generate cluster event information indicating whether or not the pixel information of the L pixel circuits fulfills a predefined cluster output condition, wherein the event processing circuit is configured to generate the cluster event information indicating that the pixel information fulfills the predefined cluster output condition based on a requirement that the pixel information indicates a plurality of instances of the pixel event information having at least one of (i) an origination from a predefined minimum number of different pixel circuits within the pixel cluster or (ii) a predefined relative timing.

2. The image sensor according to claim 1, wherein each pixel circuit comprises a pixel photocurrent circuit configured to output a pixel voltage signal, wherein a voltage level of the pixel voltage signal is a function of incoming light intensity, a voltage differencing circuit configured to generate a shifted pixel signal by shifting a voltage level of the pixel voltage signal by an amount determined by a voltage level of the pixel voltage signal at a reset time, and a pixel logic circuit configured to output the pixel event information based on a result of comparisons of the shifted pixel signal with an upper threshold voltage and a lower threshold voltage.

3. The image sensor according to claim 2, wherein the event processing circuit is configured to reset the voltage differencing circuit each time the pixel information received from the pixel circuits of a pixel cluster fulfills a predefined pixel reset condition.

4. The image sensor according to claim 2, further comprising:

a switchover circuit configured to switch control of a reset of the voltage differencing circuit between the pixel logic circuit and the event processing circuit.

5. The image sensor according to claim 2, wherein the event processing circuit is configured to reset the voltage differencing circuit and/or to generate cluster event information indicating that the pixel information of the L pixel circuits fulfills the predefined cluster output condition, if a majority of the pixel circuits of the pixel cluster output pixel event information indicating a pixel-on event and/or if a majority of the pixel circuits of the pixel cluster output pixel event information indicating a pixel-off event.

6. The image sensor according to claim 1, wherein for each pixel circuit the pixel information and the pixel event information are identical.

7. The image sensor according to claim 2, further comprising:

temporal voting circuits, wherein each temporal voting circuit is configured to generate the pixel information of a pixel circuit by digitally filtering the pixel event information output by the pixel circuit.

8. The image sensor according to claim 7, wherein each temporal voting circuit is configured to reset the voltage differencing circuit each time the pixel event information fulfills a predefined temporal pixel reset condition.

9. The image sensor according to claim 7, wherein each temporal voting circuit comprises at least one delay stage and a voting logic circuit, wherein a first one of the at least one delay stages is configured to receive at least a part of the pixel event information, and wherein the voting logic circuit is configured to generate the pixel information on the basis of at least the output signal(s) of the at least one delay stage.

10. The image sensor according to claim 9, wherein the temporal voting circuit is configured to pass the received pixel event information from delay stage to delay stage in response to a clock signal.

11. The image sensor according to claim 10, wherein the pixel circuit is configured to output pixel event information in response to the clock signal.

12. The image sensor according to claim 1, wherein the event processing circuit includes a feature extraction circuit configured to generate cluster feature information on the basis of the received pixel event information and to output the cluster feature information as the cluster event information or as part of the cluster event information.

13. The image sensor according to claim 12, wherein the feature extraction circuit comprises a temporal register and a filter circuit for each of the pixel circuits of the pixel cluster, wherein each temporal register comprises at least one delay stage, wherein the delay stage or a first one of the delay stages is configured to receive at least a part of the pixel event information of a pixel circuit, and wherein the filter circuit includes a logical conjunction operation circuit configured to output a filter output signal, multiplexer circuits configured to select an output of at least one delay stage of at least one temporal register of at least one of the pixel circuits of the pixel cluster to be signal-connected to a first input of the logical conjunction operation circuit, and a flip-flop circuit, wherein an input of the flip-flop circuit is electrically connected to an output of the logical conjunction operation circuit and wherein an output of the flip-flop circuit is electrically connected to a second input of the logical conjunction operation circuit.

14. The image sensor according to claim 13, wherein the feature extraction circuit further comprises an adder circuit for combining filter output signals of the filter circuits of the pixel circuits of the pixel cluster.

15. The image sensor according to claim 14, wherein the adder circuit comprises a plurality of pixel adder units and an analog-to-digital conversion unit for each pixel column, wherein each adder unit includes a capacitor electrically connected between the output of the filter circuit and a column filter output line, and wherein each analog-to-digital conversion unit converts an analog sum signal on the column filter output line into a digital column sum.

16. The image sensor according to claim 13, wherein at least one of the multiplexer circuits is controllable by select signals received from outside the pixel array unit, so that the event processing circuit is reconfigurable by controlling signal levels of the select signals.

* * * * *